United States Patent [19]
Yardley et al.

[11] Patent Number: 5,187,664
[45] Date of Patent: Feb. 16, 1993

[54] PROPORTIONAL POSITION-SENSING SYSTEM FOR AN AUTOMATIC GUIDED VEHICLE

[75] Inventors: James V. Yardley, Centerville; Gary L. Whatcott, Holladay; John A. M. Petersen, Bountiful, all of Utah; Herman P. Schutten, Milwaukee, Wis.

[73] Assignee: Eaton-Kenway, Inc., Salt Lake City, Utah

[21] Appl. No.: 618,793

[22] Filed: Nov. 27, 1990

[51] Int. Cl.$^5$ .............................. G06F 15/50
[52] U.S. Cl. ........................ 364/424.02; 180/167; 318/568.12
[58] Field of Search ............. 364/424.02, 424.01; 180/167-169; 318/568.12, 587

[56] References Cited

U.S. PATENT DOCUMENTS

1,799,576  4/1931  Wildhaber .

(List continued on next page.)

FOREIGN PATENT DOCUMENTS

| 7030481 | 5/1985 | Australia . |
|---|---|---|
| 50101 | 1/1981 | European Pat. Off. . |
| 77985 | 5/1983 | European Pat. Off. . |
| 108812 | 5/1984 | European Pat. Off. . |
| 124260 | 11/1984 | European Pat. Off. . |
| 193985 | 9/1986 | European Pat. Off. . |
| 206443 | 12/1986 | European Pat. Off. . |
| 2428583 | 1/1976 | Fed. Rep. of Germany . |
| 2722222 | 3/1978 | Fed. Rep. of Germany . |
| 2801045 | 9/1978 | Fed. Rep. of Germany . |
| 2833897 | 3/1979 | Fed. Rep. of Germany . |
| 2947116 | 7/1980 | Fed. Rep. of Germany . |
| 2920181 | 11/1980 | Fed. Rep. of Germany . |
| 3136355 | 3/1983 | Fed. Rep. of Germany . |
| 2336726 | 7/1977 | France . |
| 2375579 | 7/1978 | France . |
| 2526181 | 4/1983 | France . |
| 56-118602 | 9/1981 | Japan . |
| 59-135514 | 8/1984 | Japan . |
| 61-112215 | 5/1986 | Japan . |
| 50-650538 | 3/1979 | U.S.S.R. . |
| 8501012 | 3/1984 | United Kingdom . |
| 2143395 | 5/1984 | United Kingdom . |
| 2158965 | 5/1984 | United Kingdom . |
| WO80/02013 | 10/1980 | World Int. Prop. O. . |

OTHER PUBLICATIONS

Japanese Abstract vol. 5, No. 66, May 2, 1981.
IBM Publ. vol. 27 No. 4A, Sep. 1984.
German Publ. "Rechnergestutzte . . . ", 1984.
German Publ. "Rauscharme . . . ", date unknown.
Nov. 1990 article in Material Handling Engineering entitlted "AGVS: Latest Developments in Guidance Systems".
Cyplex Literature: High Performance AGV Guidance and Communications; date unknown.
Wiredriver 2 Users Guide, 1986.

*Primary Examiner*—Thomas G. Black
*Attorney, Agent, or Firm*—Lynn G. Foster

[57] ABSTRACT

Apparatus for detecting and controlling the position of an automatic guided vehicle to enable precise positioning of the vehicle at a predetermined place such as a load pickup/delivery terminal. In one embodiment a mat having a passive short-circuited loop of wire embedded in it is positioned on the floor at the terminal. On the vehicle an oscillator and a transmitting antenna provide a primary magnetic field that excited the loop in the mat whenever the vehicle is in the terminal, inducing current in the loop. The current in the loop produces a secondary magnetic field having a predetermined spatial pattern. Receiving antennas on the vehicle detect the secondary magnetic field. Prior knowledge of the spatial pattern enables onboard electronic apparatus to ascertain the position of the vehicle relative to the mat. Both transverse and longitudinal position can be detected and controlled. The same on-board apparatus enables the vehicle to follow an energized guidewire in the floor between terminals. The vehicle can also navigate by dead reckoning between terminals.

40 Claims, 29 Drawing Sheets

U. S. PATENT DOCUMENTS

| Patent No. | Date | Inventor | Class |
|---|---|---|---|
| 2,246,385 | 6/1941 | Schaper | 250/40 |
| 3,009,525 | 11/1961 | De Liban | 180/82 |
| 3,033,305 | 5/1962 | Harned et al. | 180/79.1 |
| 3,147,817 | 9/1964 | De Liban | 180/82 |
| 3,187,260 | 6/1965 | Dove | 328/57 |
| 3,198,279 | 8/1965 | Quinn | 180/79 |
| 3,431,996 | 3/1969 | Giles et al. | 180/98 |
| 3,544,788 | 12/1970 | Guzik | 246/63 |
| 3,556,244 | 1/1971 | Gray | 180/98 |
| 3,617,769 | 11/1971 | Hanson | 307/229 |
| 3,628,624 | 12/1971 | Waerner | 180/98 |
| 3,683,378 | 8/1972 | Polhemus | 343/7 ED |
| 3,693,028 | 9/1972 | Fussell | 307/235 |
| 3,734,229 | 5/1973 | Comer | 180/98 |
| 3,757,887 | 11/1973 | Moore | 180/98 |
| 3,773,136 | 11/1973 | Palazetti | 180/98 |
| 3,849,636 | 11/1974 | Helms | 235/150.27 |
| 4,007,382 | 2/1977 | Warberg | 307/236 |
| 4,010,409 | 3/1977 | Waites | 318/587 |
| 4,020,487 | 4/1977 | Winter | 340/347 NT |
| 4,023,753 | 5/1977 | Dobler | 246/5 |
| 4,043,418 | 8/1977 | Blakeslee | 180/98 |
| 4,083,008 | 4/1978 | Eschke | 325/163 |
| 4,088,939 | 5/1978 | Mitschke | 318/376 |
| 4,097,808 | 6/1978 | Parke | 325/51 |
| 4,127,182 | 11/1978 | Thole | 180/98 |
| 4,215,759 | 8/1980 | Diaz | 180/168 |
| 4,222,008 | 9/1980 | Mezrich | 328/28 |
| 4,247,896 | 1/1981 | Schmelbel | 364/436 |
| 4,253,541 | 3/1981 | Iida et al. | 180/168 |
| 4,258,813 | 3/1981 | Rukel | 180/168 |
| 4,260,990 | 4/1981 | Lichtblau | 343/742 |
| 4,284,160 | 8/1981 | De Liban | 180/168 |
| 4,284,941 | 8/1981 | Regueiro | 318/587 |
| 4,307,329 | 12/1981 | Taylor | 318/587 |
| 4,310,789 | 1/1982 | Mank et al. | 318/587 |
| 4,322,670 | 3/1982 | Taylor | 318/587 |
| 4,333,024 | 6/1982 | Maussion | 307/351 |
| 4,361,202 | 11/1982 | Minovitch | 180/168 |
| 4,454,583 | 6/1984 | Schneiderhan et al. | 364/449 |
| 4,472,716 | 9/1984 | Hansen | 340/905 |
| 4,535,294 | 8/1985 | Ericksen et al. | 328/150 |
| 4,541,049 | 9/1985 | Ahlborn | 364/424.02 |
| 4,556,864 | 12/1985 | Roy | 340/310 A |
| 4,593,238 | 6/1986 | Yamamoto | 318/587 |
| 4,593,239 | 6/1986 | Yamamoto | 318/587 |
| 4,613,804 | 9/1986 | Swenson | 318/587 |
| 4,613,973 | 9/1986 | Dahl | 375/37 |
| 4,626,993 | 12/1986 | Okuyama et al. | 364/424.02 |
| 4,630,216 | 12/1986 | Tyler et al. | 364/478 |
| 4,658,928 | 4/1987 | Seo | 180/168 |
| 4,660,999 | 7/1987 | Ito et al. | 364/513 |
| 4,700,302 | 10/1987 | Arakawa et al. | 364/424 |
| 4,711,316 | 12/1987 | Katou et al. | 180/168 |
| 4,716,530 | 12/1987 | Ogawa et al. | 364/424.02 |
| 4,727,492 | 2/1988 | Reeve et al. | 364/424.02 |
| 4,731,867 | 3/1988 | Seabury | 455/41 |
| 4,742,283 | 5/1988 | Bolger et al. | 318/587 |
| 4,751,516 | 6/1988 | Lichtblau | 343/742 |
| 4,777,601 | 10/1988 | Boegli | 364/424.02 |
| 4,791,570 | 12/1988 | Sherman et al. | 364/436 |
| 4,800,978 | 1/1989 | Wasa et al. | 180/168 |
| 4,811,229 | 3/1989 | Wilson | 364/424.02 |
| 4,817,750 | 4/1989 | Ishida et al. | 180/168 |
| 4,847,769 | 7/1989 | Reeve | 364/424.02 |
| 4,847,774 | 7/1989 | Tomikawa et al. | 364/449 |
| 4,902,948 | 2/1990 | Sherman et al. | 318/580 |
| 4,908,557 | 3/1990 | Sudare et al. | 318/587 |
| 4,939,650 | 7/1990 | Nishikawa | 364/424.02 |
| 4,939,651 | 7/1990 | Onishi | 364/424.02 |
| 4,942,531 | 7/1990 | Hainsworth et al. | 364/424.02 |
| 4,987,540 | 1/1991 | Luke, Jr. | 364/424.02 |
| 4,990,841 | 2/1991 | Elder | 318/587 |
| 4,993,507 | 2/1991 | Ohkura | 180/168 |
| 4,996,468 | 2/1991 | Field | 318/587 |
| 5,000,279 | 3/1991 | Konda et al. | 180/168 |
| 5,023,790 | 6/1991 | Luke, Jr. | 364/424.02 |

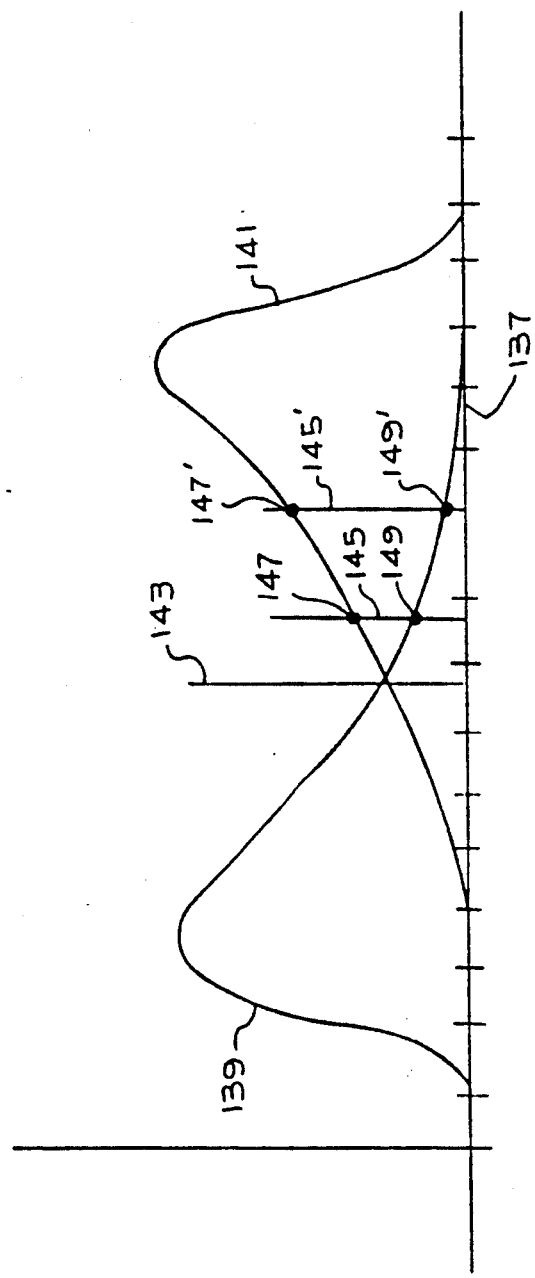

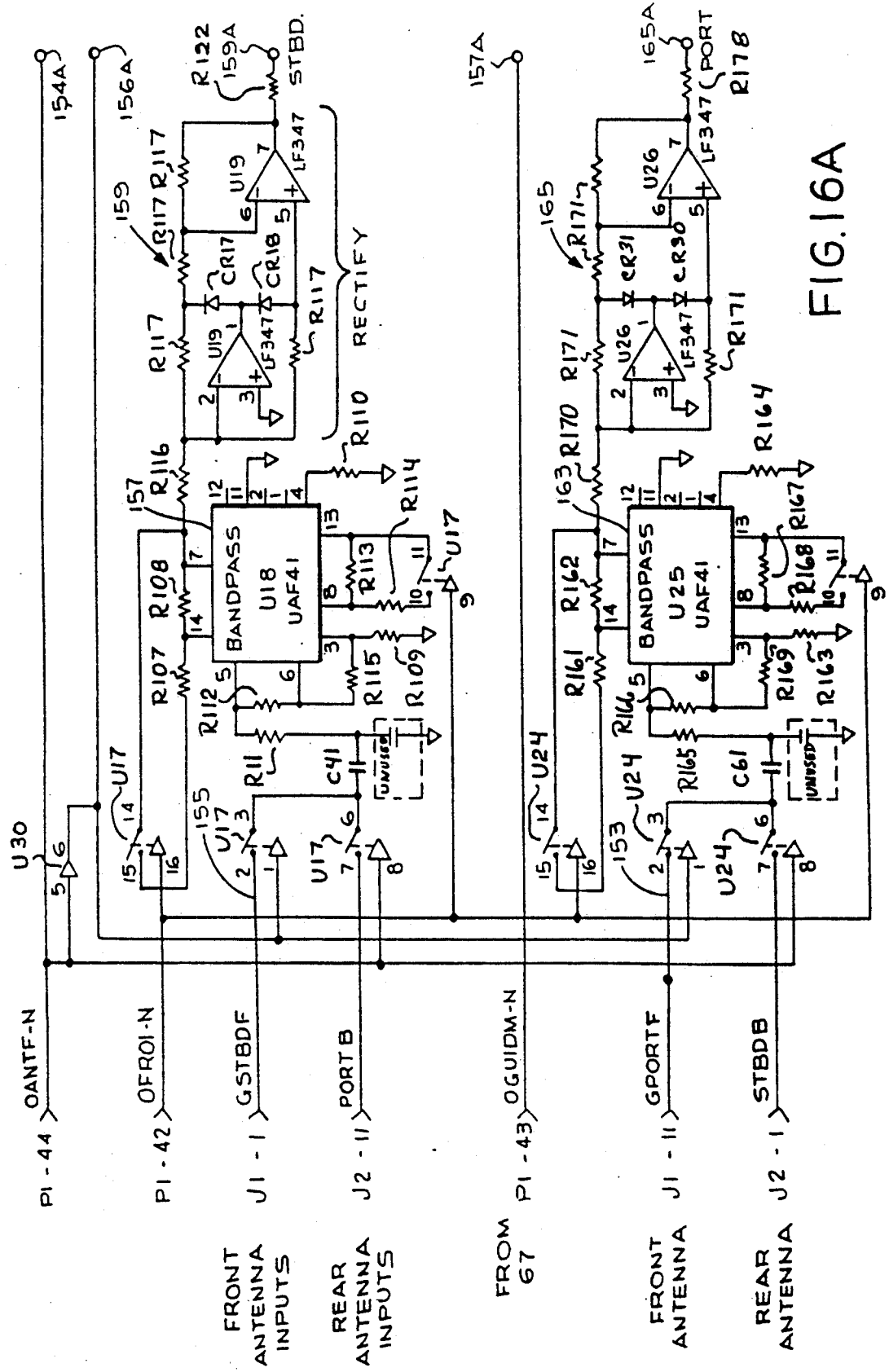

PROPORTIONAL POSITION-SENSING SYSTEM FOR AN AUTOMATIC GUIDED VEHICLE

FIELD

The field of the invention is the automatic guidance of vehicles, including vehicles that navigate without a driver on board either by self-contained navigation and guidance or by following a guide wire in the floor, and that come into one or more terminals on their routes.

SUMMARY

One object of the invention is to provide apparatus for enabling an automatic guided vehicle to ascertain and control its position rather precisely at a predetermined area on the floor, such as at a terminal.

Another object is to provide apparatus to enable an automatic guided vehicle to ascertain not only its position relative to a floor reference system, but also its heading, by sensing the lateral positions of two sensors on the vehicle that are spaced apart longitudinally.

Another object is to provide position-sensing apparatus in which only passive elements are required on (or in) the floor and all energy required for the sensing of position comes from the vehicle, at least at certain areas such as in a terminal.

Another object is to provide position-sensing apparatus in which the passive elements of equipment at the floor comprise one or more passive loops of electrical conductor.

Another object is to provide a position-sensing apparatus having a magnetic-signal receiving system that compensates for undesired signals, such as those received directly from its transmitting antennas on the vehicle, and responds only to signals received indirectly via floor-mounted passive loops.

Another object is to provide a position-sensing apparatus on a vehicle in which two receiving coils are spaced apart on only one high-permeability magnetic core to improve the linearity of response of the signals as a function of the amount of their offset from a passive loop on the floor.

Another object is to provide apparatus to enable an automatic guided vehicle to utilize equipment in common to ascertain and control both its lateral and longitudinal positions relative to a known reference on the floor at, for example, a terminal.

Another object is to provide a system for positioning a vehicle in which the vehicle is automatically guided to a predetermined station or terminal by one type of guidance mode and is precisely positioned within the station by another type of guidance mode.

In a system having vehicles capable of ordinarily navigating without any guide wires in the floor between terminals and of positioning themselves accurately at terminals, an inventive object is to provide terminal-positioning apparatus of a type that enables those same vehicles to operate also in hybrid factory installations that have some guide wires in the floor; the terminal-positioning portions of the guidance apparatus are utilized for the additional purpose of following the guide wires in the floor in order to navigate between stations.

Another object is to provide vehicle terminal-positioning apparatus that enables a vehicle to operate in a hybrid installation that has active guide wires (i.e., guide wires energized by conductive connections) at the floor within some of its terminals, and that has passive loops (i.e., conductive loops energized by magnetic induction) at the floor within others of its terminals.

Another object, in one embodiment, is to utilize one or more phase-locked loops to process signals received by receiving antennas in detecting a passive conductive floor loop, and in which the receiving circuits have capability for initialization and for automatic gain control of the phase-locked signal level.

BRIEF DESCRIPTION OF THE FIGURES

FIG. 10B. Graph of amplitudes of signals seen in FIG. 10A showing a lateral offset used to control the vehicle's lateral position relative to the current carrying wire.

FIG. 16A. Circuit diagram of a bandpass-filtering and signal-rectifying portion of the equipment for a guide-wire-tracking mode of operation (middle portion of circuit).

DESCRIPTION OF PREFERRED EMBODIMENTS

Overview of an Automatic Guided Vehicle Installation

Figure 1:
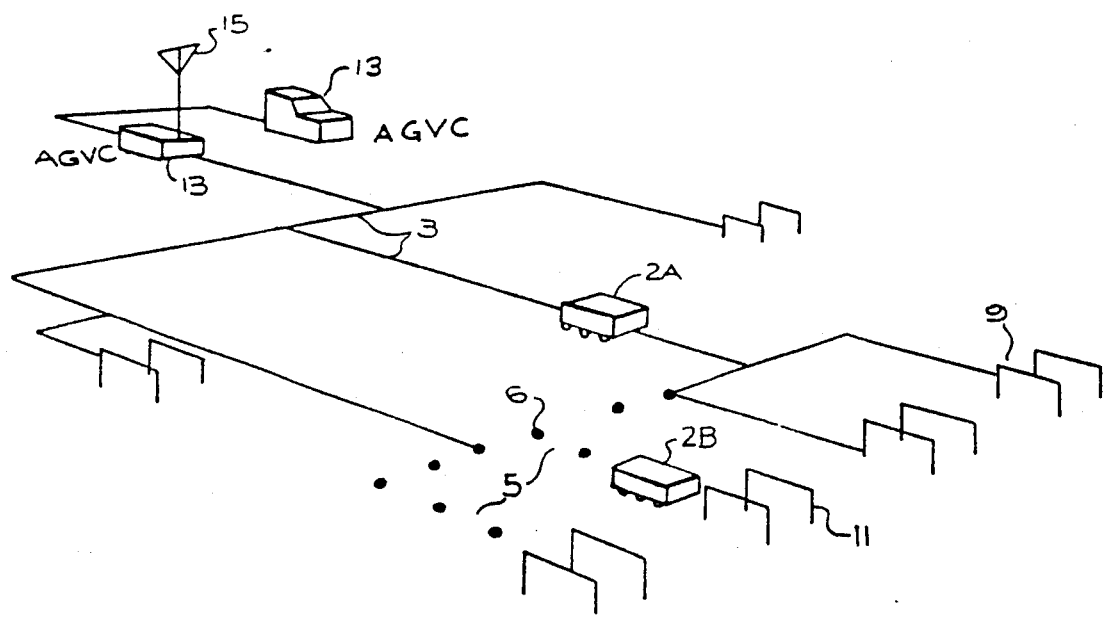
FIG. 1. Overview of an illustrative application of a preferred embodiment of the invention, including vehicular routes and some terminals for pickup and delivery.

In FIG. 1 the interior of a warehouse building is shown, in which guided vehicles 2A, 2B travel about on routes such as routes 3 and 5 among a number of terminals such as terminals 9 and 11. This is an example of a hybrid facility. The routes 3 have guide wires in the floor to define the routes and guide the vehicles; the routes 5 are traversed by self-contained navigation and guidance and radio control without guide wires in the floor, but with update magnets located at irregular intervals as much as 50 feet apart along the routes. The same vehicles are used on both types of routes.

Floor-control equipment 13, labeled AGVC, provides signals to the vehicles via guide wires embedded in the floor when they are operating on the portion 3 of the routes that have guide wires embedded in the floor. The AGVC has a transmitting antenna for communicating by two-way radio with the vehicles when the vehicles are operating on portions 5 of the routes that are defined by floor magnets such as magnet 6.

Figure 2:
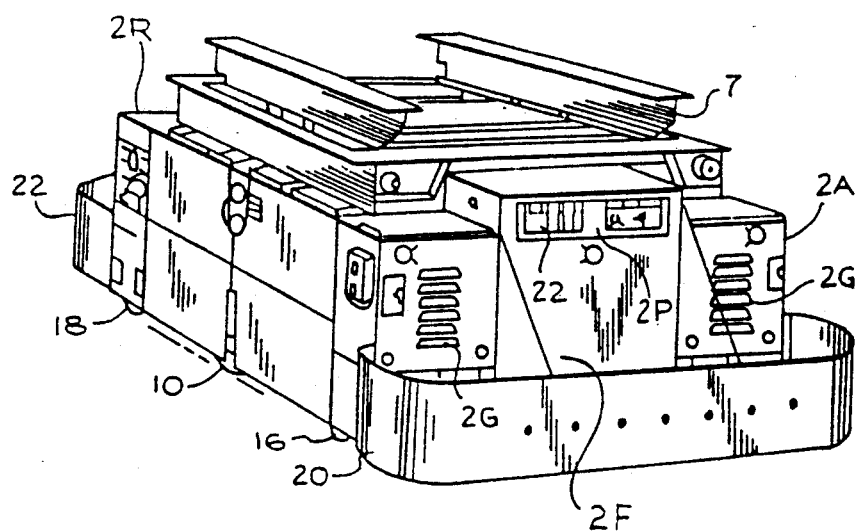
FIG. 2. Perspective view of an automatic guided vehicle.
Figure 3:
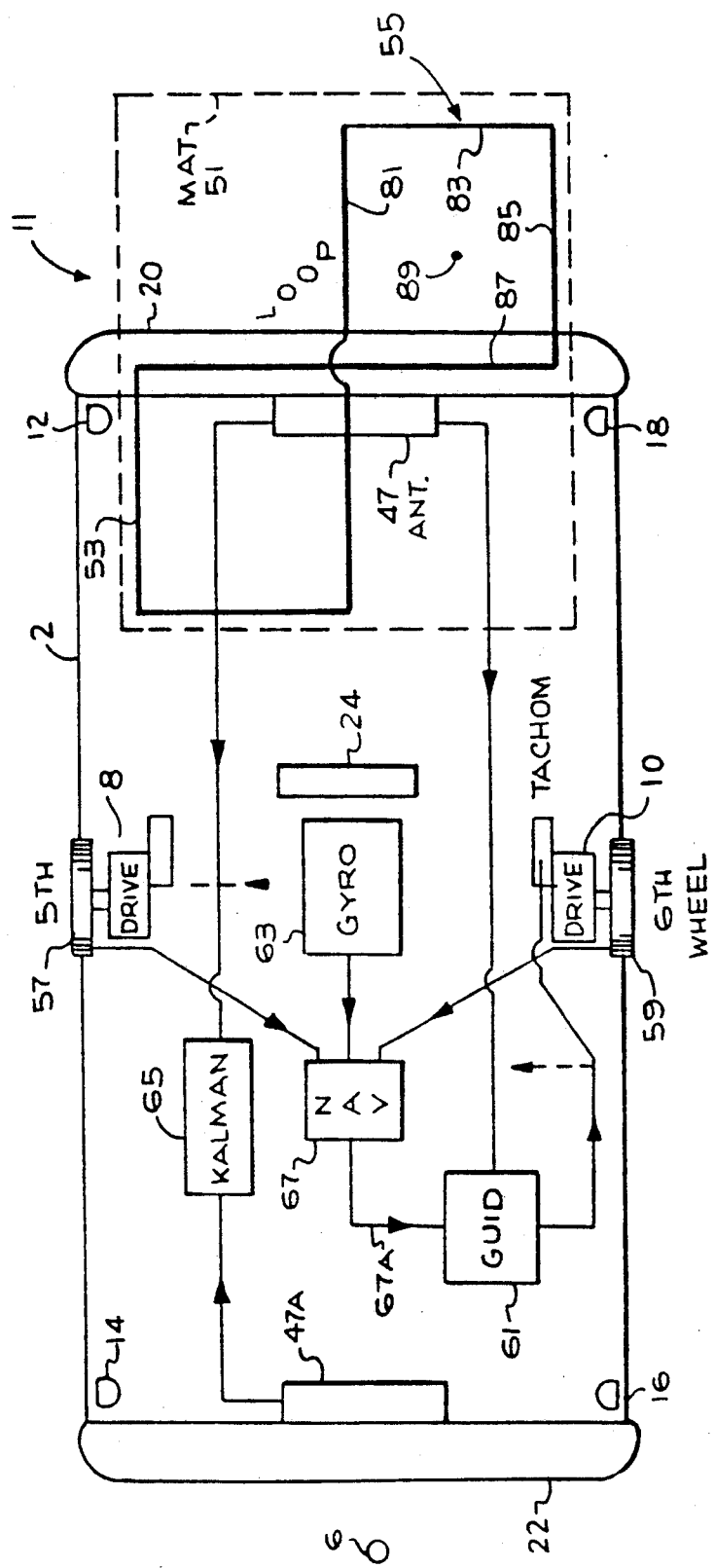
FIG. 3. Simplified top view of the vehicle and of a passive loop of conductor in a floor mat at a terminal.

One of the vehicles 2A is depicted isometrically in FIG. 2. It has drive wheels 8, 10 on its port and starboard sides respectively, which are powered individually by motors as shown in FIGS. 3 and 4. Casters 12, 14, 16 and 18 support the vehicle at its port front, port rear, starboard front and starboard rear corners respectively. The terms port, starboard, front and rear refer to physical absolutes of the vehicle. The terms left and right are relative to the direction of travel which is always termed forward; the vehicle operates symmetrically in either direction. The front 2F of vehicle 2A as seen in FIG. 2 comprises and is identified by two laterally disposed grills 2G and a control panel 2P which comprises a light 2L. The rear 2R of vehicle 2A is the other end. Port and starboard are referenced to the front 2F of vehicle 2A. These terms are generally used for all vehicles.

Touch-sensitive bumpers 20, 22 are located at the front and rear of the vehicle to detect obstacles in the path and to activate switches to stop the vehicle. More information about portions of this system is given in a co-pending application, Ser. No. 07/544,693, filed Jun. 27, 1990, entitled "Update Marker System for Navigation of an Automatic Guided Vehicle," inventors Bryan A. Bloomfield, et al., which is assigned to the same assignee as the present application. That co-pending application is made a part of the present application by reference.

Another invention in which a guided vehicle follows passive conductors on the floor is described in U.S. Pat. No. 4,613,804, issued Sep. 23, 1986, entitled "Floor Position Sensing Apparatus and Method," invented by R. R. Swenson and assigned to the assignee of the present invention. That Patent is also made a part of the present application by reference.

A simplified top view of the vehicle 2A is shown conceptually in FIG. 3. An update magnet 6 is shown on the floor on the left side of the figure. It is part of a main guidance system that can bring the vehicle to the entrance of terminal 11, for example. This is a guidance system of the type represented by the routes 5 of FIG. 1.

On the ground at the terminal 11 is a mat 51, which has a loop of wire 54 in the shape of a skewed figure eight embedded in it. A left-hand portion or lobe of the loop is designated 53 and a right-hand portion or lobe is designated 55. An antenna system 47 is near the front of the vehicle; it is centered on a longitudinal centerline of the vehicle and extends transversely. A similar antenna system 47A is at the rear.

FIG. 3 also shows an array of Hall sensors 24 that are employed in the main guidance system of the vehicle, as well as other main guidance subsystems and components including a gyroscope 63, a navigation computer 67, an motion control processor (computer) 61 and fifth and sixth wheels 57, 59 for measuring the travel of the port and starboard sides respectively of the vehicle.

The position-sensing portion of the vehicle includes a magnetic-field transmitter on the vehicle, the passive loop of wire 54 on the floor, and signal-receiving equipment on the vehicle. During operation of the system as a whole the vehicles 2A, 2B drive about on the various segments of the routes 3, 5 as shown in FIG. 1 to pick up and deliver loads. The vehicles are propelled forward and steered by rotation of the drive wheels 8 and 10. The direction and speed of each wheel is controlled by its respective portion of a control system as described below with the aid of FIG. 4A.

Electronic Controls Overview

Figure 4A:
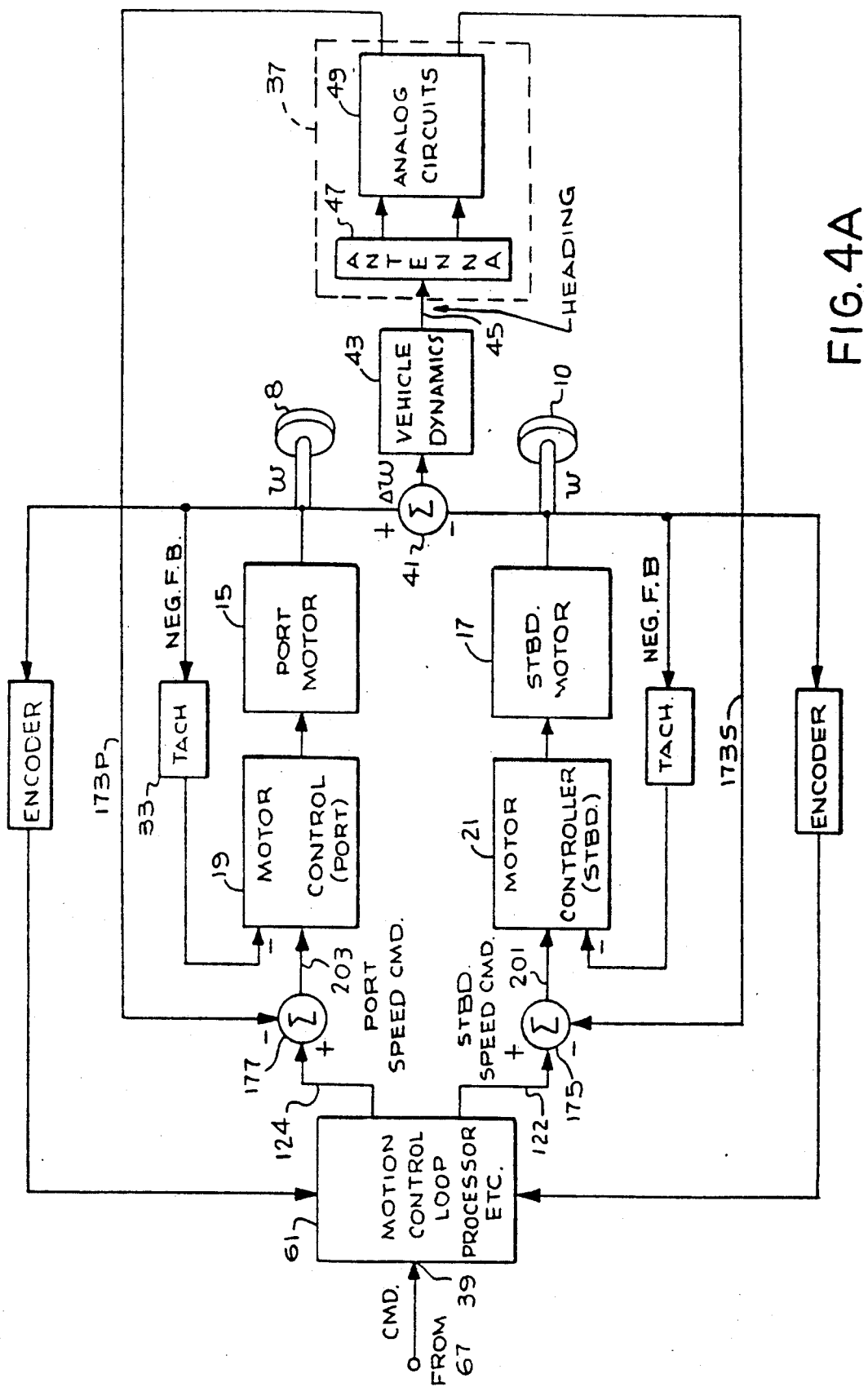
FIG. 4A. Simplified electronic block diagram of a guidance system for a vehicle which operates in both a general purpose and a terminal-positioning mode.

Various types of guidance systems could be used for controlling the vehicle when it is not in a terminal. FIG. 4A shows a "motion control processor" of a preferred control system for a vehicle. The port drive wheel 8 is driven by a port motor 15. The port motor 15 is controlled by a port motor controller 19, which receives control signals from a summing junction 177.

Inputs to the summing junction 177 include: control signals at an input 124 that come from the motion control processor 61; an input from a tachometer 33 that measures the speed of the port motor 15; and an input 173P from a terminal-positioning-mode module 37 of a vehicle navigation and guidance system, which will be described in detail below.

In a similar arrangement, a starboard motor 17 is controlled by a motor controller 21 that is driven by the output of a summing junction 175, which receives speed commands from the motion control processor 61. The summing junction 175 also receives signals from a starboard tachometer and from the terminal-positioning-mode module 37.

The motion control processor 61 receives commands at an input 39 from a self-contained navigation and guidance system.

The vehicle is driven in forward and reverse directions, relative to the front of the vehicle, and is steered in accordance with the speeds of the wheels 8, 10. The actions of the drive wheels 8, 10 affect the vehicle in a manner that is represented symbolically by a summing junction 41 and by a block 43 labeled "vehicle dynamics" on FIG. 4A.

The spacing between the wheels and other factors are represented by the block 43. Outputs of the block 43 are represented symbolically at a point 45. The outputs are the speed and heading of the vehicle as well as, when integrated, the position of the vehicle. The position of the vehicle controls the error signals as the vehicle moves about, for example, when it enters a terminal 9, 11. As shown in block 37 of FIG. 4A the terminal-positioning-mode of the vehicle navigation and guidance system includes the antenna assembly 47 and an analog circuit block 49, both of which will be described in detail.

Commands for control of the vehicle are at terminal 39 on the left side of FIG. 4A. Commands and feedback signals such as 173P and 173S are conducted through the summing junctions 177, 175 to the port motor controller 19 and the starboard motor controller 21 respectively. They drive the port motor 15 and the starboard motor 17 respectively, which drive the port and starboard wheels 8, 10 respectively.

When the vehicle 2A enters a terminal having a passive loop floor mat 51, it comes principally under the control of the terminal-positioning mode of the vehicle navigation and guidance system, etc. This system produces signals 118, 120 that are input to the motion control processor of FIG. 4A.

When a vehicle with an incorrect lateral position (e.g., with an offset from the centerline of the terminal), enters a terminal an error signal is generated by the terminal-positioning mode of the vehicle navigation and guidance system. The signals at lines 118, 120, in combination, produce an error signal which has such polarity (see also FIG. 12B) as to operate the motors 15, 17 to steer the vehicle in a direction to correct the error of position. Antenna output signal conditioning circuits similar to those seen in FIG. 12B for front-end antenna signal conditioning, not shown, are located at the rear-end of the vehicle but are of opposite hand.

Figure 4B:
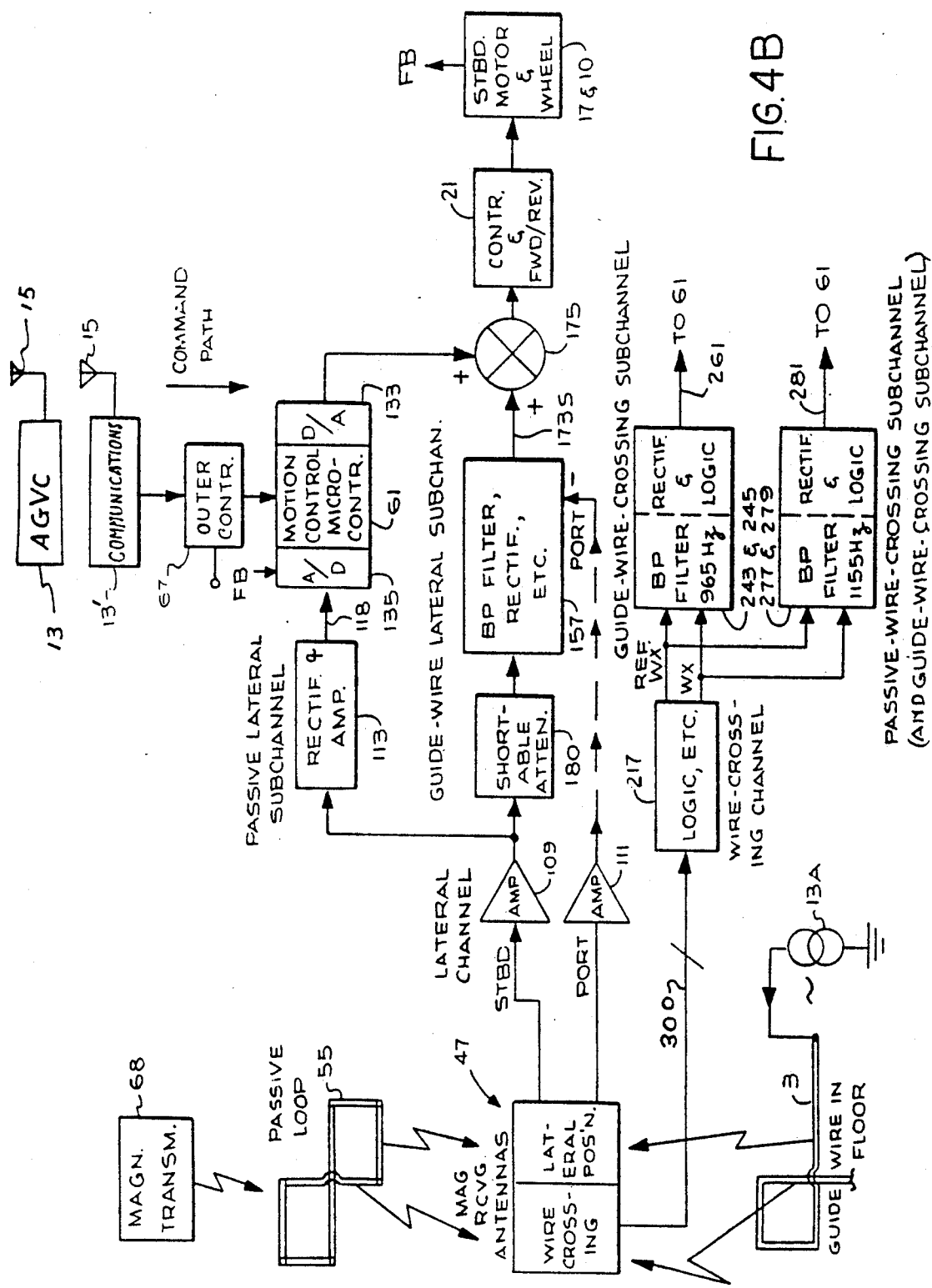
FIG. 4B. Simplified block diagram providing an overview of interconnections of major subsystems which operate in a terminal-positioning mode.

When the vehicle has proceeded longitudinally to where a wire-cross exists, another signal, on line 300 of FIG. 4B, notifies the outer loop processor 67, which takes appropriate action of altering speed commands. The antenna assembly 47 of FIG. 4B includes antennas that are receptive to the transverse wire-crossing portion 87 of the loop 55, as will be described in more detail below in sections relating to wire-crossing positioning of the vehicle. The longitudinal position of the vehicle is controlled by the motor controllers 19 and 21, which operate the motors 19, 17 so as to move the vehicle forward and back as necessary to position it over the wire-crossing portion 87 of the passive loop of mat 51, etc.

Overview of Interconnections of Major Subsystems

FIG. 4B is a simplified diagram showing the relationships between major subsystems of the terminal-positioning mode of the vehicle navigation and guidance system.

Commands from the AGVC 13, which stores map-like route and vehicle-location information, by wireless transmission to communications block 13' go to an outer loop microcontroller 67 whose outputs go to a motion control microcontroller 61. They then pass through a D/A converter 133 to a summing junction 175. The output of summing junction 175 goes to a controller 21 and forward/reverse block, which drives the starboard motor 17 and wheel 10. Only the starboard circuits are being described.

As the vehicle moves about to carry out the commands that its receives, feedback signals responsive to its position are generated. They are processed and entered into the control system through several channels. As shown on FIG. 4B, these channels include a Passive Lateral Subchannel at terminal 118, a Guide-Wire Lateral Subchannel at terminal 173S, a Guide-Wire-Crossing Subchannel 261 and a Passive-Wire-Crossing Subchannel 281. The channels are described briefly here to show their relationships, and in much greater detail in subsequent sections.

A magnetic transmitter 68 couples magnetic energy to a passive loop 55 on the floor in a terminal. Induced current in the passive loop 55 produces magnetic fields that are sensed by a receiving antenna system 47. The receiving antenna system 47 comprises separates magnetic receiving antennas for lateral positioning of the vehicle and for wire-crossing positioning of the vehicle.

Instead of being energized by the magnetic transmitter 68, the magnetic receiving antennas 47 can, alternatively, be energized by magnetic fields produced by a wire 3 in the floor, as shown on FIG. 4B. The wire 3 in the floor is energized by the AGVC 13, which is represented on FIG. 4B for drafting convenience by an AC generator 13A.

Output from the lateral-positioning system's antennas are connected to a right Lateral Channel 109, which will be described in more detail, and to a left Lateral Channel which will not be described because it is the same as the right Lateral Channel.

The right Lateral Channel divides into a Passive Lateral Subchannel, including rectifier 113 and an amplifier. The Passive Lateral Subchannel connects through an A/D converter 135 to the motion control processor 61, where it joins the command signals. Signals then pass through the D/A converter 133 and are input to the summing junction 175.

Figure 4C:
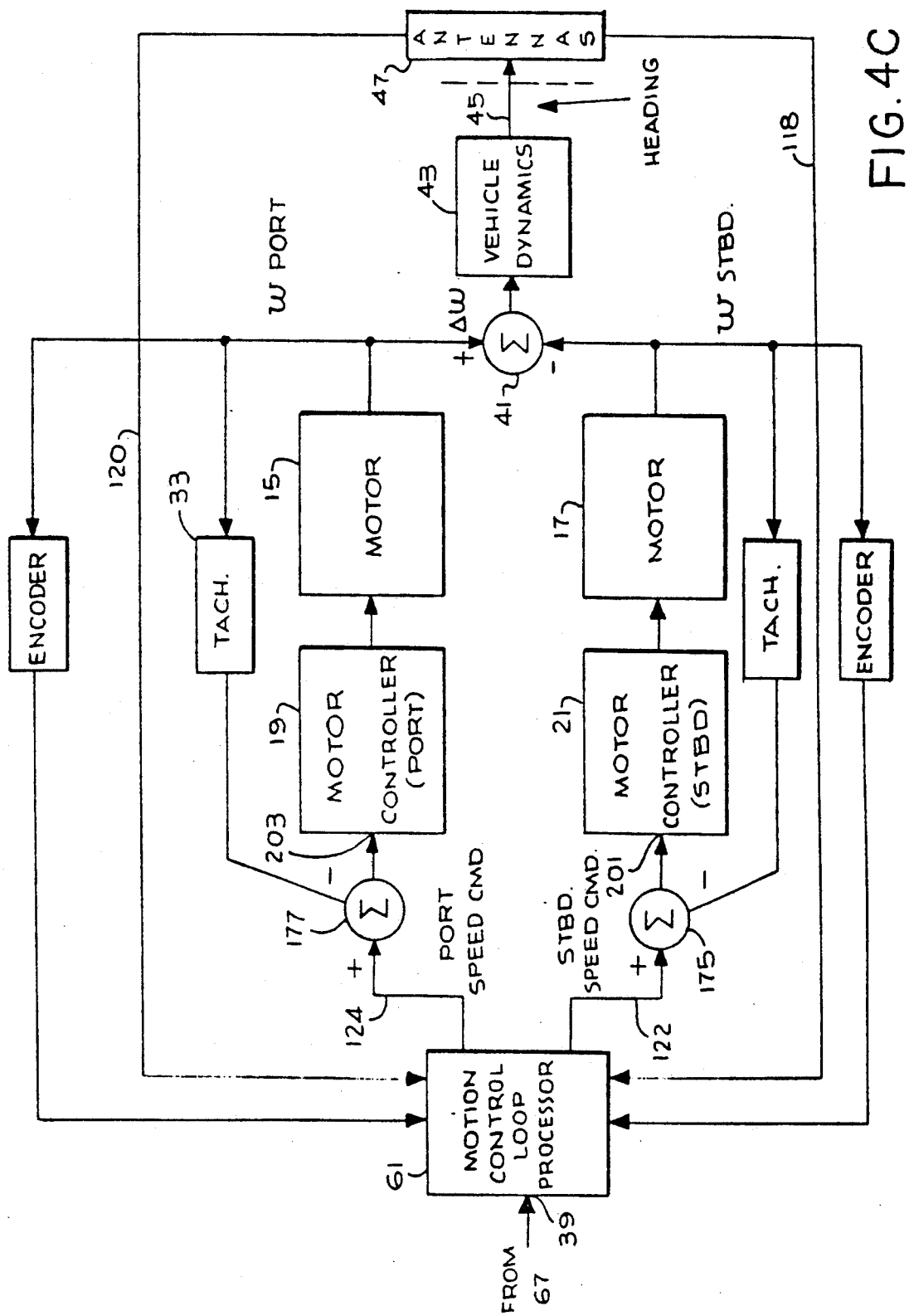
FIG. 4C. Simplified electronic block diagram similar to FIG. 4A, but showing only elements that are used when the apparatus is in the terminal positioning mode of operation and omitting other elements.

FIG. 4C is a simplified version of FIG. 4A. It is a functional block diagram showing elements that are in use when the equipment is in the terminal-positioning mode of operation. The Passive Lateral Subchannel components, which are used in the Terminal-positioning mode of operation are shown. The analog circuits 49 are not shown in FIG. 4C because they are effectively by-passed when the terminal-positioning mode is operating.

The right Lateral Channel 109 also goes to a Guide-Wire Lateral Subchannel, which starts at a shortable attenuator 180, FIG. 4B. (Most of a corresponding left portion of the channel, starting at 111, is omitted from FIG. 4B.) The right Lateral Channel then goes to a bandpass filter 157 and other signal-processing elements. It is switchable by a switch 170 (controlled by outer controller 67) before terminal 173S to allow input to the summing junction 175 when guiding over a guide wire 3 in the floor, and to prevent interference from signal at 173S when guiding over a passive wire 55 in the floor.

The wire-crossing receiving antennas are connected to a Wire-Crossing Channel at logic circuits 217, etc. These circuits produce a wire-crossing signal WX and a wire-crossing reference signal REFWX, both of which are connected to two subchannels.

The first of the two wire-crossing subchannels is a Passive-Wire-Crossing Subchannel that starts with 1155-Hz bandpass filters 277 and 279. Its signal proceeds through rectifier and logic circuits to an output terminal 281. Terminal 281 is connected to the outer loop microcontroller 67, completing a positioning-feedback loop.

The other subchannel to which the Wire-Crossing-Channel is connected is the Guide-Wire Crossing Subchannel of FIG. 4B. It starts with 965-Hz bandpass filters 243 and 245. The signals proceed through rectifiers and logic circuitry to terminal 261. From there the feedback signals are connected to the outer loop microcontroller 67, where they joint he command signals from the AGVC 13, to complete a positioning-feedback loop.

When a vehicle is in a terminal that has a passive loop 55 on the floor, lateral positioning is accomplished by means of the Lateral Channel and the Passive Lateral Subchannel. Longitudinal positioning is accomplished through the Wire-Crossing Channel and the Passive-Wire-Crossing Subchannel.

When a vehicle is in a terminal having an active guide wire in the floor, lateral positioning of the vehicle is accomplished through the Lateral Channel and the Guide-Wire Lateral Subchannel. Longitudinal positioning is accomplished by means of the Wire-Crossing Channel and the Guide-Wire-Crossing Subchannel.

When a vehicle is not in a terminal and is on a route, such as route 5, that has only update magnets, guidance is accomplished by self-contained navigation and guidance.

When a vehicle is not in a terminal and is on a route, such as route 5, in which there are actively energized guidewires in the floor, lateral positioning is accomplished by means of the Lateral Channel and the Guide-Wire Lateral Subchannel. Longitudinal positioning can be accomplished between terminals where there is a wire crossing by means of the Wire-Crossing Channel and the Guide-Wire-Crossing Subchannel.

Magnetic Fields Transmitter

Figure 5:
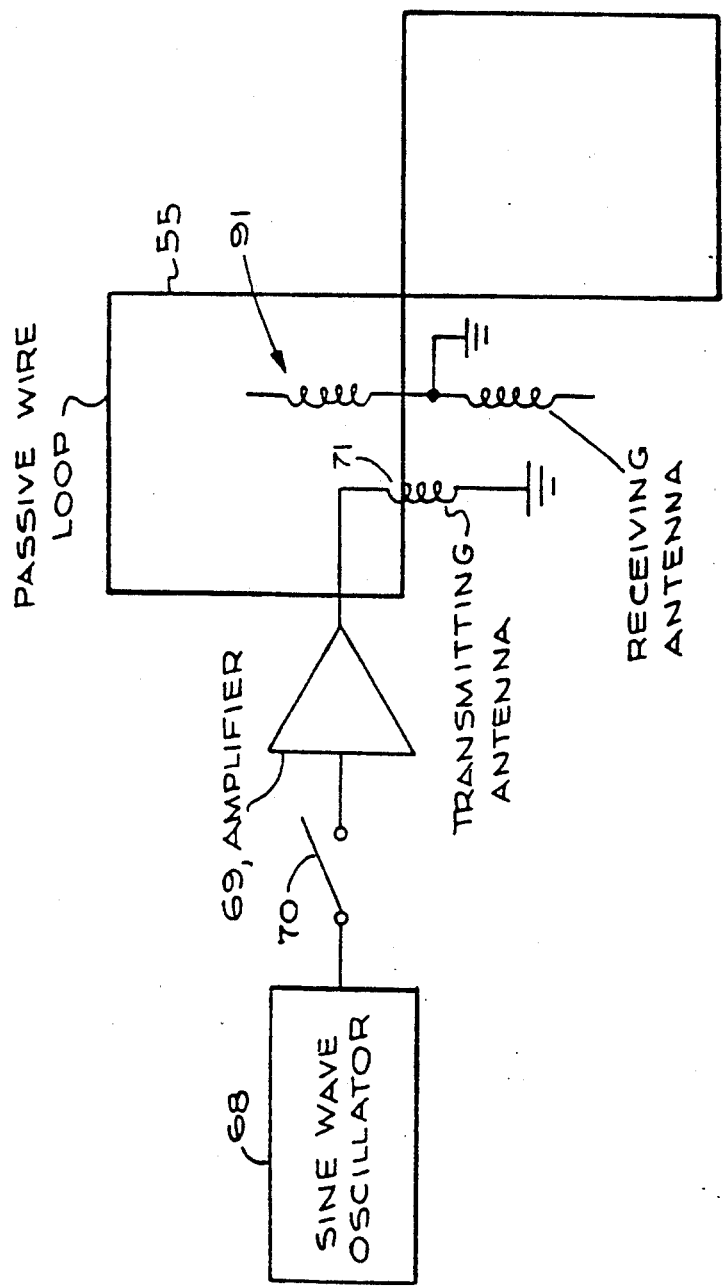
FIG. 5. Simplified block diagram of certain components of a vehicle navigation and guidance system on a vehicle for transmitting a magnetic field when operating in the terminal-positioning mode.

The subsystem 37 of FIG. 4A includes a magnetic field transmitter that is shown in simplified form in FIG. 5. A sinusoidal waveform oscillator 68 on the vehicle is connected through a switch 70 and an amplifier 69 to a transmitting antenna 71 to provide a magnetic field signal of frequency 1,155 Hz. The transmitting antenna 71 is part of the antenna assembly 47 shown on FIGS. 3 and 4A.

Figure 6:
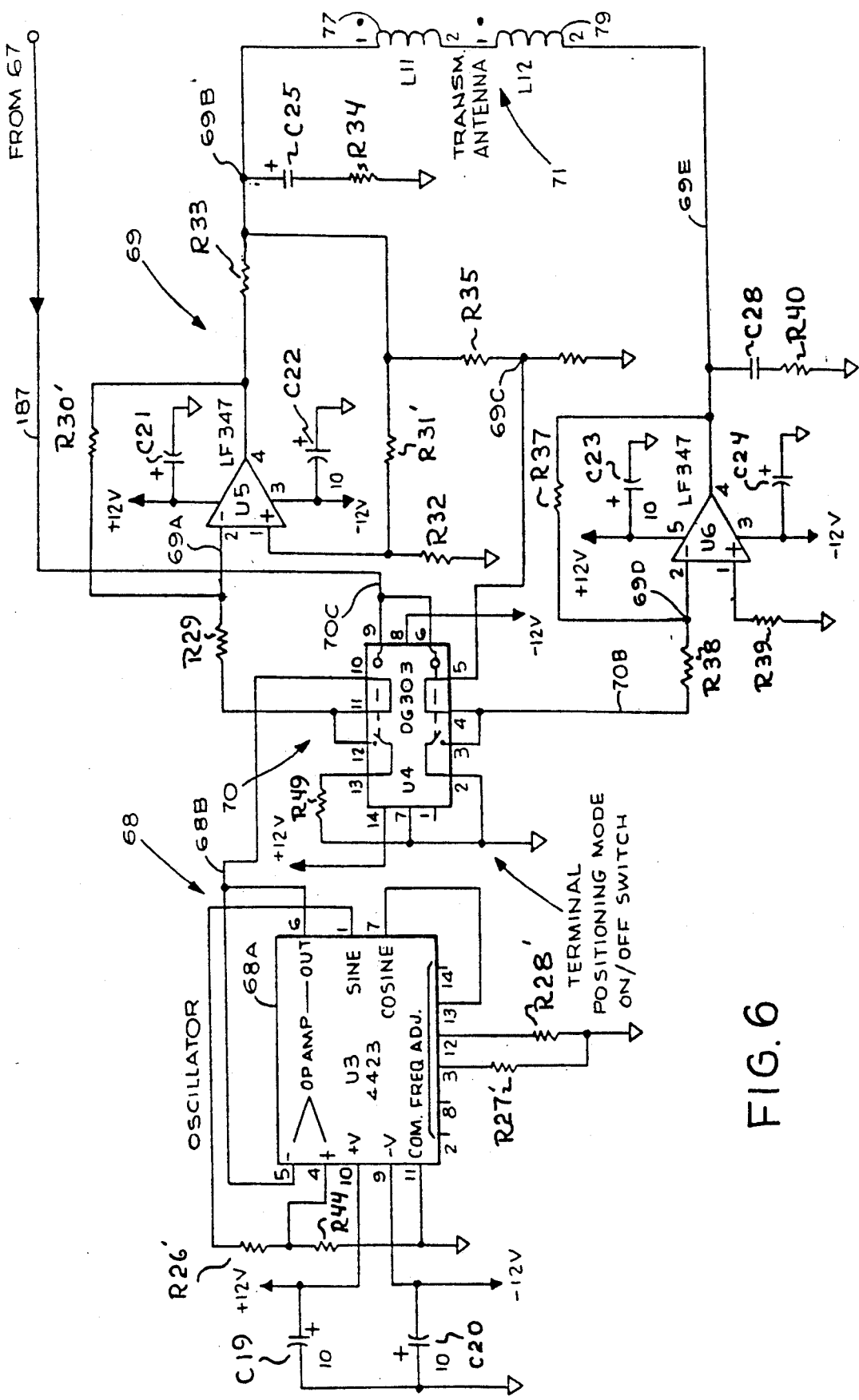
FIG. 6. Circuit diagram of an oscillator, switch, driver, and transmitting antenna of FIG. 5, which are transmitter portions of the preferred vehicle navigation system when operating in the terminal-positioning mode.

The transmitter is shown in more detail in FIG. 6. The main component of its oscillator 68 is a conventional commercially available chip 68A. Its output at terminal 68B is connected to the analog on-off switch 70. When the switch is in a conductive condition the oscillator's signal is connected to input 69A of one side of a push-pull current driver amplifier 69.

The output at 69B of one amplifier 69 is connected through a resistor to a point 69C, which is connected to another pole of the analog switch 70. The output of that pole at 70B is connected to an inverting input 69D of another side of the push-pull driver amplifier 69. The output of that other side is at a terminal 69E.

The output terminals 69B, 69E of the push-pull drivers 69 are connected to two series-connected coils 71A, 71B of the transmitting antenna 71, as shown in FIG. 6.

The analog on-off switch 70 is operated by a signal at a terminal 70C, which comes from the outer loop microprocessor 67. The transmitter system comprising elements 68, 69, 70 and 71 is turned off by operation of the switch 70 when the vehicle is being operated in a mode in which it follows an actively energized guide wire. The outer loop processor receives information from the AGVC 13, which keeps track of whether or not the vehicle is approaching or in a terminal.

Figure 7:
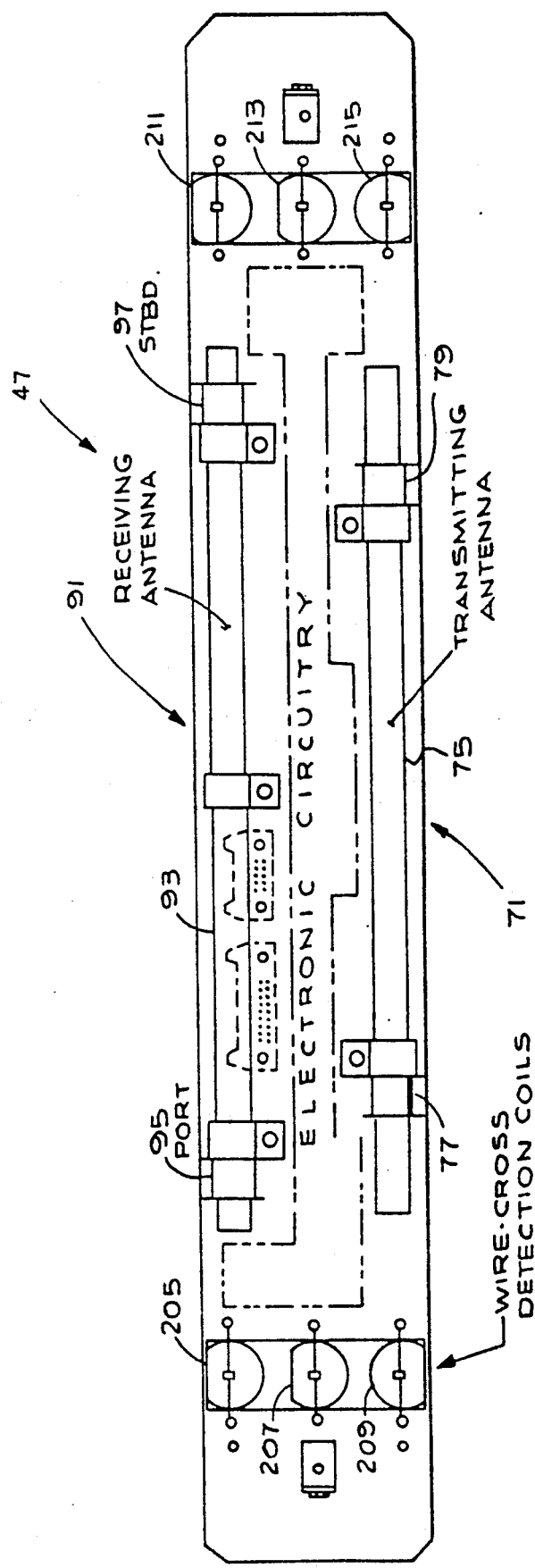
FIG. 7. A circuit board layout showing antennas for lateral and wire-cross positioning operations.

As shown in FIG. 7, the transmitting antenna 71 includes a ferrite rod 75 that serves as a core for the antenna. The relative magnetic permeability of the ferrite rod is about 2000. Mounted on the core 75 near its ends are a left-side coil of wire 77 and a right-side coil 79. The push-pull drivers 69 are connected to the coils 77, 79 with such polarity that the coils produce reinforcing magnetomotive force (of the same phase) in the ferrite rod 75.

The lateral position of the transmitting antenna 71 relative to the center 81 of the floor loop assembly 54 has very little effect on the amount of current induced in the passive loop 54 within a wide lateral range between the transmitting coils 77, 79 because the amount of magnetic flux linking the loop 54 does not change appreciably within that range. The electric current induced in the loop 54, is, however, inversely dependent upon the vertical and longitudinal distance between the transmitting antenna 71 and the central wire portion 81 of the loop 54.

The operation of the transmitter is as follows: The oscillator 68 produces a signal which can be connected through the analog on-off switch 70 to the push-pull drivers 69. The output signal from the push-pull drivers 69 energizes the transmitting antenna 71.

The transmitting antenna produces a magnetic field that extends downward to encircle the wire element 81 of the loop 54 (or any wire that is within the range of the transmitting antenna, e.g., a guide wire in the floor). In the case of a loop such as loop 54, the AC magnetic field produced by the antenna 71 induces a current in the wire segment 81, and that current produces a magnetic field surrounding the wire segments 81, 87, etc. of the loop 54.

Receiving Antennas and Their Magnetic Coupling with Wires on Floor

FIG. 7 also shows a receiving antenna assembly 91. It detects magnetic fields produced by currents in wires on the floor. In this preferred embodiment, a single ferrite rod core 93 is used, with one receiving coil 95 mounted near the left end of the rod and another receiving coil 97 mounted near the right end of the rod 93. Alternatively, two shorter ferrite rods can be employed with a fixed lateral space between them, each encircled by only one of the two receiving coils 95, 97.

In this embodiment the receiving antenna assembly 91 is mounted parallel to and close to the transmitting antenna 71. The signal that the receiving antenna assembly 91 receives has two components: (a) a signal from either the passive loop of wire 54 or a guide wire in the floor and (b) a direct signal from the transmitting antenna 71 if it is on. Because the position of the transmitting antenna 71 is fixed in relation to the receiving antenna 91 the undesired direct signal component is relatively constant, so it can be deducted.

Referring now to the component of signal received from the wires in the floor such as the wire 81 of the loop 54, the current in each coil 95, 97 of the receiving antenna assembly 91 depends upon the nearness of the receiving antenna 91 as a whole to the plastic floor mat 51 and upon the lateral displacement of the receiving antenna 91 from the center wire segment 81 of the passive loop 54.

Figure 8:
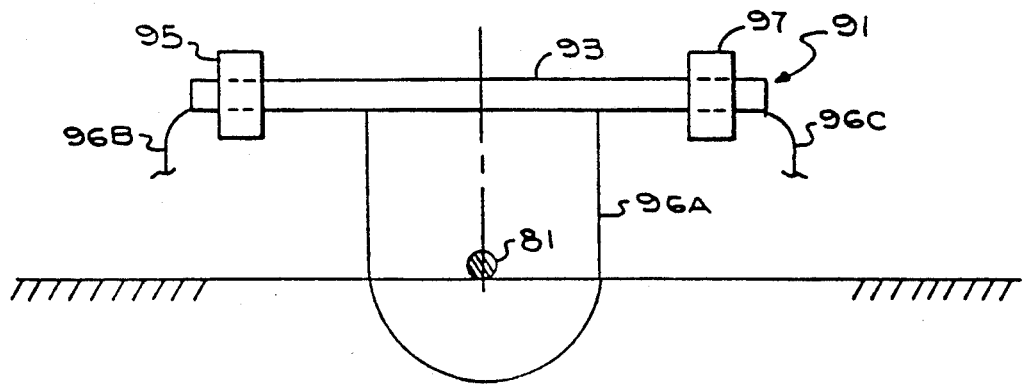
FIG. 8. Vertical sectional view of a conductor on the floor and a receiving antenna assembly on a vehicle that is centered above it.
Figure 9:
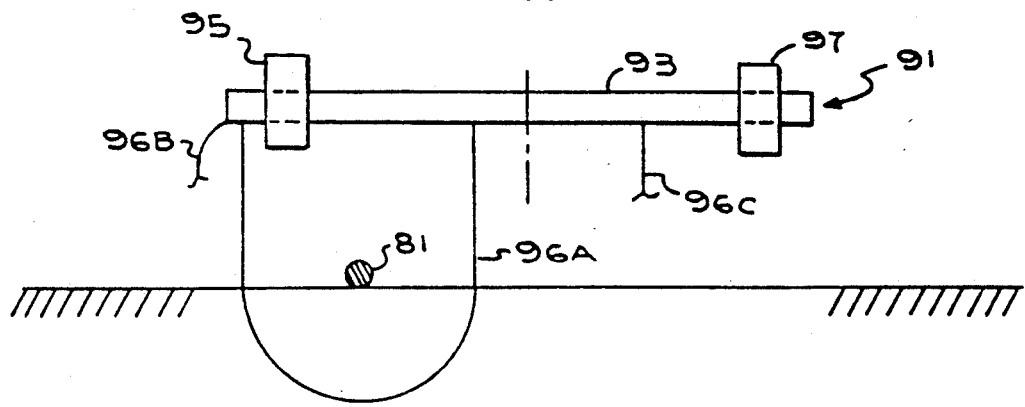
FIG. 9. Another vertical sectional view of a conductor on the floor and a receiving antenna assembly that is offset laterally above it.

The relationship between received signals and lateral displacement is relatively linear for the central 90% of the lateral distance between the two receiving coils 95, 97, FIG. 7. The ferrite rod 97 helps to provide this linearity. FIGS. 8 and 9 illustrate the manner in which magnetic flux produced by electric current in the wire 81 (FIG. 3) enters the ferrite receiving rod 93 and links the coils 95, 97. In order to facilitate the explanation, FIGS. 8 and 9 are not drawn to scale.

In FIG. 8 the receiving antenna 91 is centered laterally over the current-carrying conductor 81, while in FIG. 9 the antenna 91 is offset laterally from the conductor 81. The direction of lines of magnetic flux is shown by a stylized line sketch 96A in FIG. 8. Other lines of flux 96B, 96C of course enter the ferrite rod at its left- and right-hand ends, and hence encircle the turns of the coils 95, 97. The FIG. 81 can represent several turns of wire in some embodiments.

In FIG. 9 the flux line 96A encircles the coil 95, because of the offset position of the antenna 91. The flux line 96B still enters the left end of the rod 93 and encircles the coil 95. When the vehicle is offset, the partially shown flux line 96C no longer encircles the right coil 97. This arrangement, in which a single ferrite rod is used for both receiving coils, has been found to improve the linearity of the induced signal in the receiving system as a function of the offset of the vehicle from the current-carrying conductor 81.

Figure 10A:
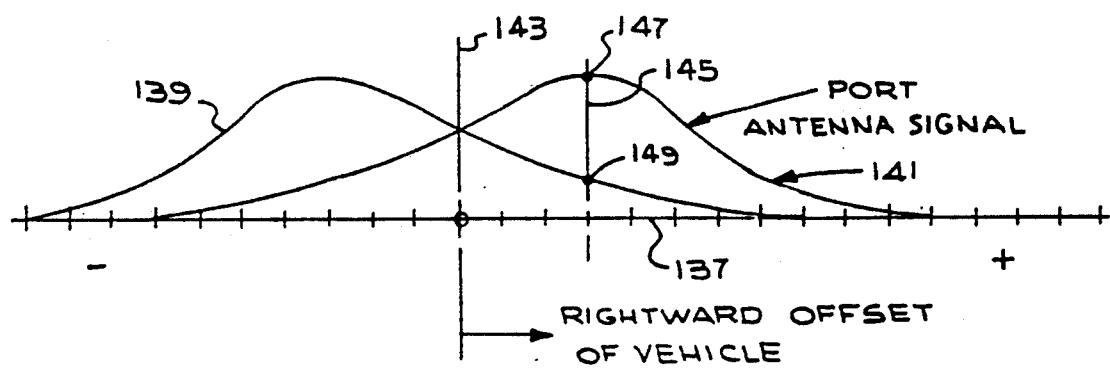
FIG. 10A. Graph of amplitudes of signals received at magnetic receiving antennas on the vehicle as a function of the vehicle's lateral location relative to a current carrying wire (such as a part of a conductive loop) on the floor.

A graph of the amplitudes of signals induced in the receiving antenna coils 95, 97 is shown in FIG. 10A. The abscissa 137 represents the lateral offset of the vehicle from the longitudinal centerline of the terminal 11. The ordinate 143 of the graph of FIG. 10A represents signal strength at the coils 95, 97.

In particular the starboard receiving antenna coil 97 produces a signal shown by a curve 139, and the left antenna receiving coil produces a signal shown by a curve 141. When the vehicle is exactly in the position defined by the programmed lateral offset and represented by the vertical line 143 of FIG. 10A, the signals 139 and 141 cause the wheels 8, 10 to rotate at equal speeds.

For example, when the lateral offset is zero and when the vehicle comprises an offset such as at the vertical line 145, the left antenna 95 receives a much stronger signal, as indicated by a point 147 on the curve 141, than does the right antenna coil 97, as indicated by the weaker signal at a point 149 of the curve 139. The result is that the left wheel 8 is then driven slower than the right wheel 10 and the vehicle's position is corrected to center the vehicle over the guide wire as it moves forward into the terminal 11 or, alternatively, along a guide wire in the floor in the terminal 9.

From time to time, it may be desirable to drive the vehicle with an offset lateral to a guide wire. This is accomplished under program control by the motion control processor 61 wherein a lateral offset bias is digitally added to one of the signals over terminals 118, 120, after digitization. As seen in FIG. 10B, which comprises the same axes and curves seen in FIG. 10A, a desired offset 145' away from center line 143 establishes two curve 139 and 141 intersections, 149' and 147', respectively. The lateral offset bias is calculated as the difference between the values at intersections 149' and 147' and comprising a sign opposite an error on the same side of center line 143.

Figure 13:
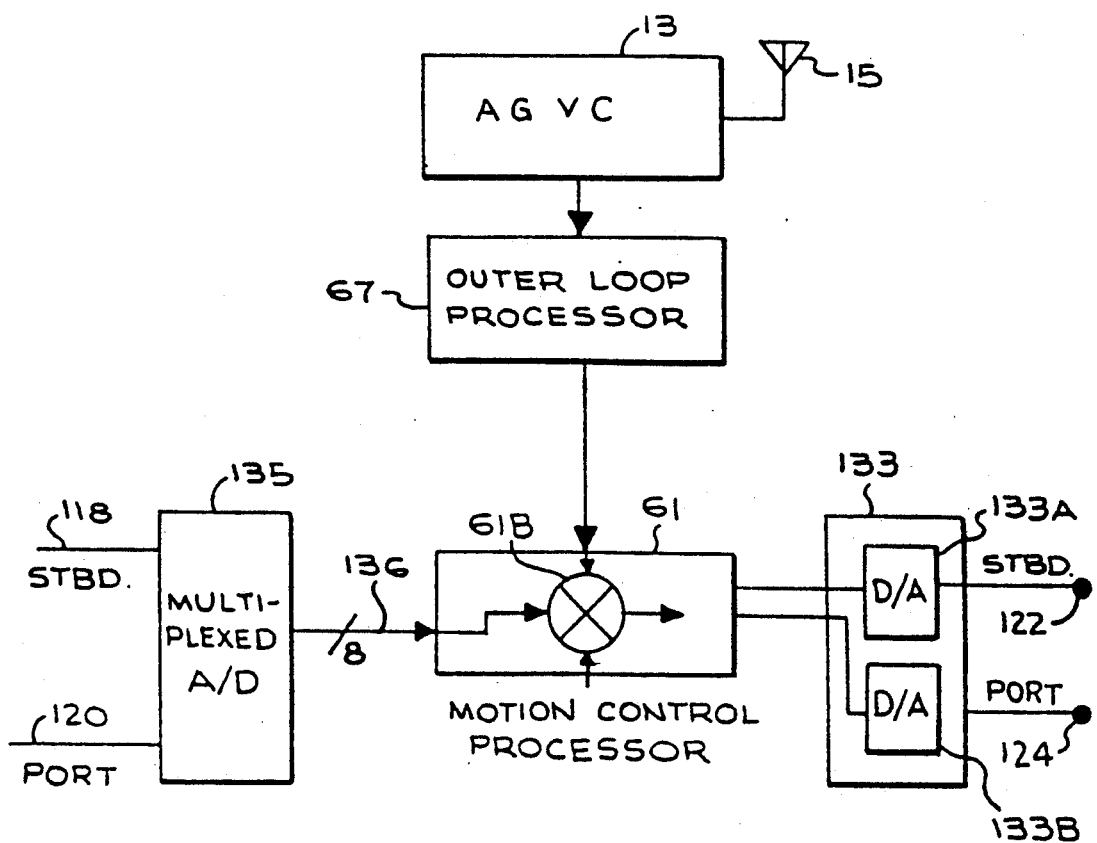
FIG. 13. Block diagram showing an automatic guided vehicle controller (AGVC), microprocessors, and some equipment for operation in a passive wire loop mode.

Hybridity of Self-Contained Navigation-and-Guidance and Proportional-Positioning System Figures relating to hybridity include FIGS. 4 and 13. The vehicle navigation and guidance system, in the self-contained mode, operates by starting with a known position and heading and measuring the distances traveled by both the left and right sides of the vehicle. It integrates those distances to keep track of the location of the vehicle. The position is updated periodically by detecting a magnet of known position such as magnet 6 in the floor over which the vehicle travels.

The AGVC 13 keeps track of the status and position of each vehicle. The AGVC 13 has terminal information and a map of the path layout stored in memory. When a vehicle is directed to a terminal, such as a terminal 11, that has a passive floor loop 54 and not an active guide wire, the AGVC 13 tells the outer loop processor 67 to guide in the terminal-positioning mode of the vehicle navigation and guidance system. Commands and other signals pass between computer 67 and computer 61 on a line 67A of FIG. 3. The outer loop guidance microcontroller 67 then sends a control signal on a line 187 (FIGS. 6 and 15) to a switch 70 that energizes the transmitting antenna 71. It also sends a control signal to another switch 185 that causes attenuation of the guide-wire-signal channel (terminals 153 and 155) of FIG. 15 (and FIGS. 14, 16A).

Figure 16B:
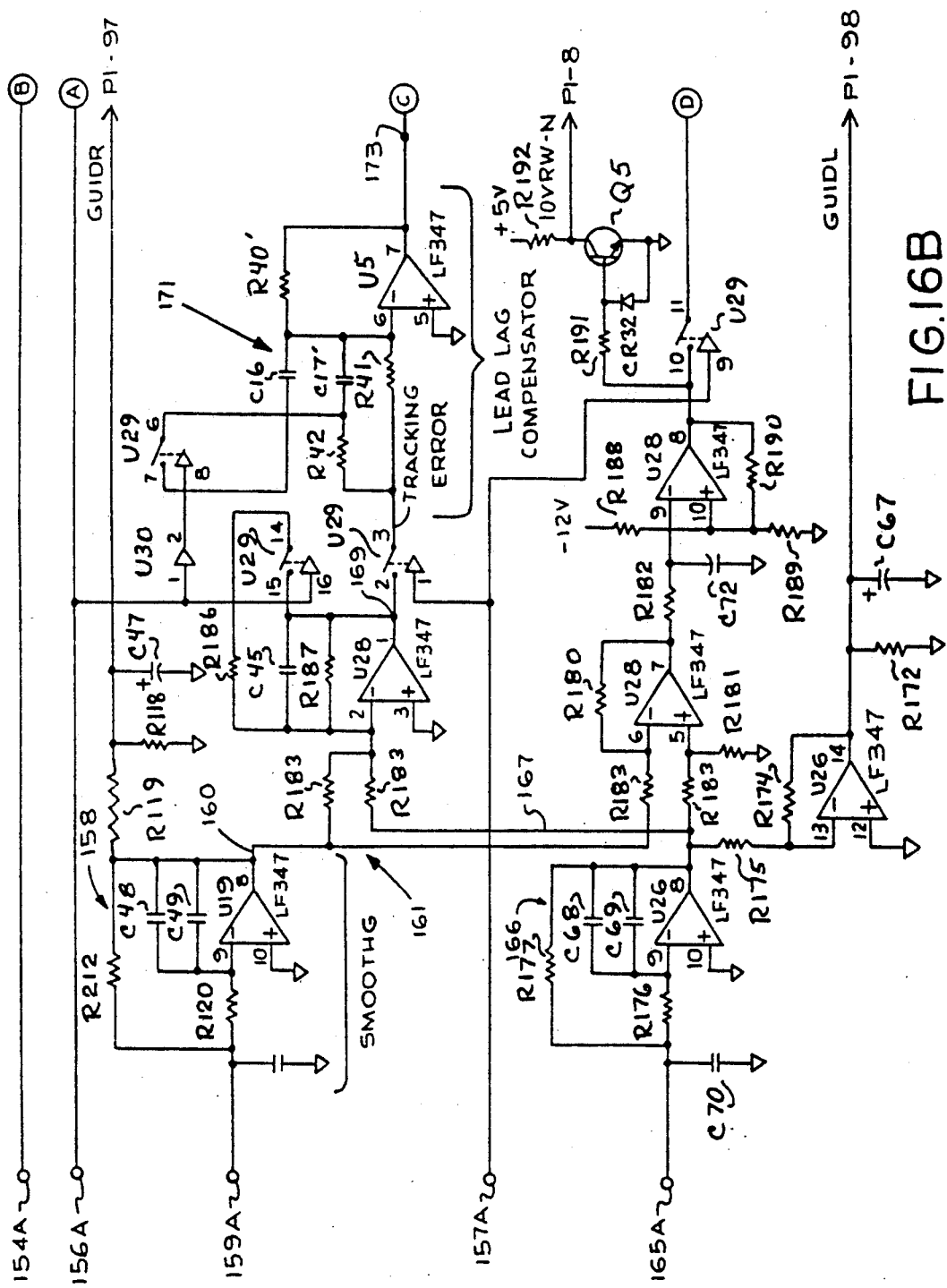
FIG. 16B. Circuit diagram, a continuation of FIG. 16A, of a smoothing and compensator portion of the equipment for a guide-wire-tracking mode of operation.

The active guide-wire-signal channel's error signal at terminal 169 of FIG. 16B is switched off so that it does not interfere with the passive wire loop's signal at terminals 122 and 124. This insures that the passive wire loop's signal (FIGS. 12 and 13) completely controls the vehicle. More detailed descriptions of the circuits involved are presented below.

Lateral Positioning of a Vehicle at a Terminal Having a Passive Floor Loop

Figure 11:
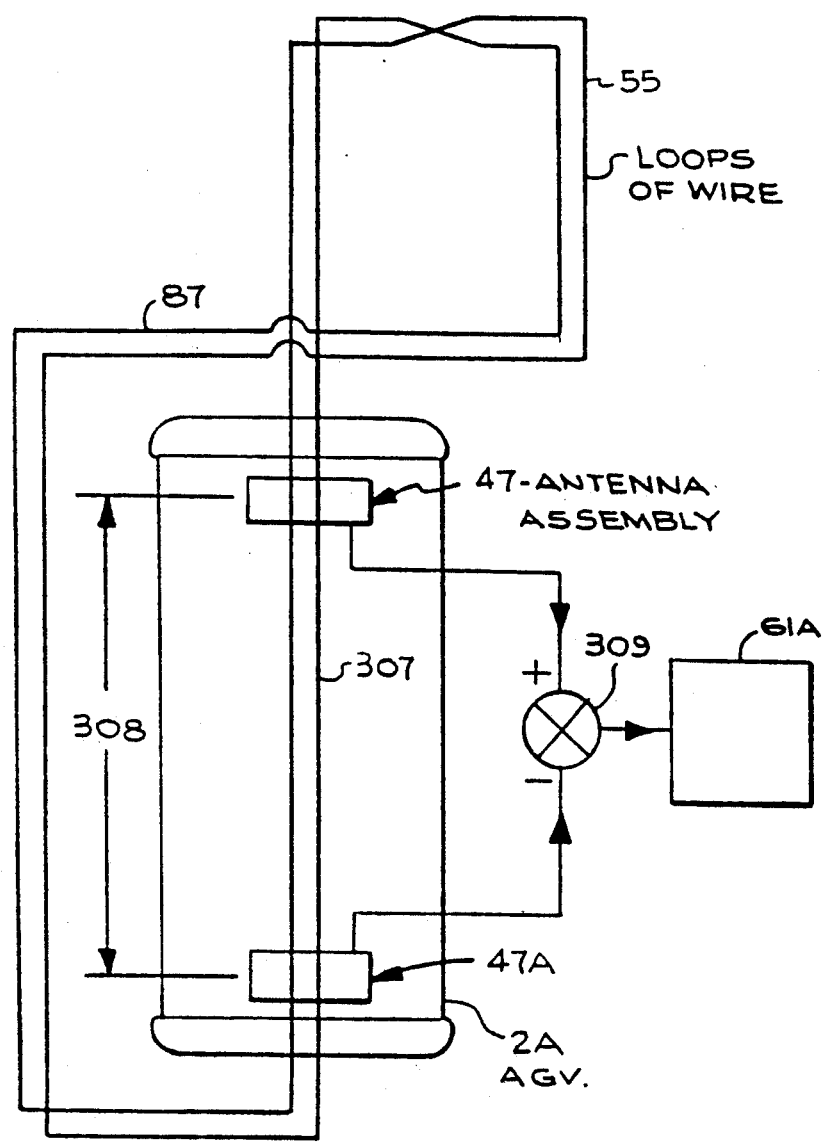
FIG. 11. Plan view of an alternative configuration of antennas and a passive loop arrangement having two turns.

FIG. 11 shows a conductive loop that is short-circuited to itself and doubled over so that it has two turns. One, two or any other convenient number of turns can be used. If preferred, separate superimposed shorted loops could of course be used instead. They are folded to form the skewed figure 8 of FIG. 11 in order to produce a wire cross at any desired position. Loops can of course be used for precise positioning of vehicles at places other than terminals if desired.

The location of an automatic guided vehicle 2A is shown and its antenna assembly 47 is indicated on the vehicle. The longitudinal conductors are designated by the reference number 81 and the transverse or cross wires are designated 87.

Figure 12A:
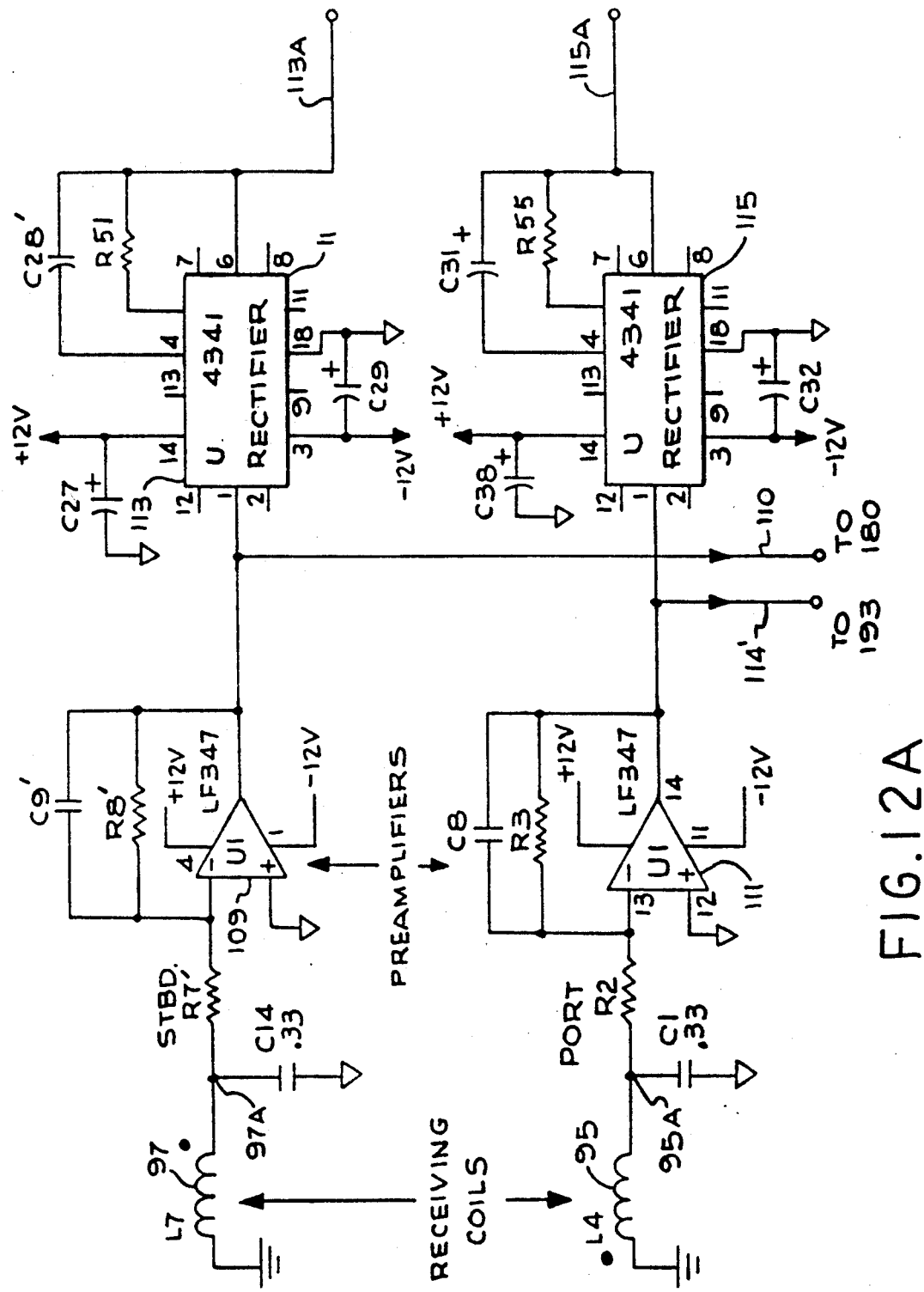
FIG. 12A. Circuit diagram of receiving antennas, preamplifiers used in common by several circuits. Also shown are rectifiers for terminal-positioning operation in which only a passive loop of wire is on the floor.
Figure 12B:
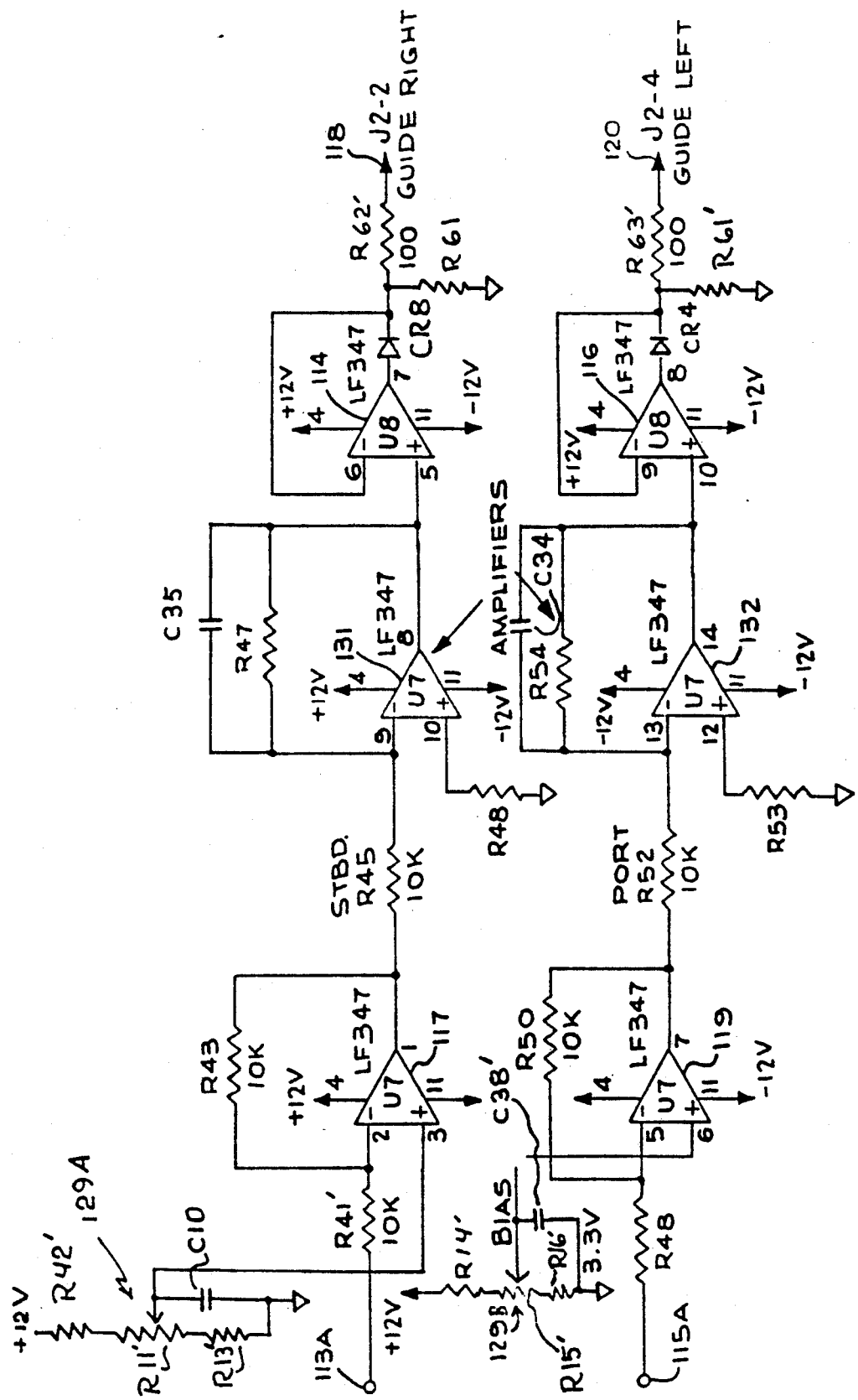
FIG. 12B. Circuit diagram, continued from FIG. 12A, of antenna output signal conditioning circuits for vehicle front-end terminal-positioning operation in which only a passive loop of wire is on the floor.

FIGS. 12A and 12B show a circuit diagram of a portion of the receiving equipment for receiving magnetic field information. The equipment of FIGS. 12A and 12B is part of block 151 of FIG. 14. In FIG. 12A the receiving antenna's coils 95 and 97 are shown at the left side of the figure with one terminal of each coil connected to ground. The instantaneous polarity of one coil relative to the other is indicated by the dots.

The circuits of FIGS. 12A and 12B are symmetrical for left and right signals so only the right channel will be described in detail. Coil 97 is connected to a preamplifier 109, which serves also as a lowpass filter to suppress high-frequency noise. The output of the preamplifier 109 is connected to a bandpass filter 109A with center frequency equal to the frequency of the transmitting oscillator 68. The output of the bandpass filter is rectified by rectifier 113 to convert the signal to a DC value.

The DC output of rectifier 113 is connected via terminal 113A to a shifting amplifier 117. The non-inverting input of that same amplifier receives a bias from an adjustable voltage-dividing biasing circuit 129A, which, at the output of amplifier 117, offsets the signal that was received from rectifier 113.

The bias of amplifier 117 is a DC bias for offsetting the direct magnetic coupling received from the transmit antenna. The purpose of the bias is to remove as much of the direct coupling component of the signal as possible so that only the signal from the guide wire is amplified, thus enabling a subsequent analog-to-digital converter 135 to be a high-resolution type.

It would not be necessary to the bias 129A to be adjustable because it is sufficient to offset the signal only approximately, but it is adjustable in the preferred embodiment. The left signal is later subtracted from the right signal in the motion control processor 61 anyway, so the portion of the direct signal that is not properly biased at amplifier 117 would be cancelled by the subtraction if the antennas are centered with respect to each other. However, an adjustable bias on both right (129A) and left (129B) sides eliminates the need to adjust the antenna assembly, and allows bias adjustments to be made manually any time after the antennas are fixed in position. An automatic bias adjustment embodiment is described below in a section called Automatic Bias-Setting Embodiment.

The motion control processor 61 can also observe what the offset is when the vehicle is far removed from any floor wire, store that offset value, and use it to compensate the signals received while processing.

An inverting amplifier 131 receives the DC output signal from the amplifier 117, and a half-wave rectifying, unity gain amplifier 114, which follows amplifier 131, outputs values greater than or equal to zero as required by the A/D converter.

In a similar manner the left-coil signal from coil 95 is processed by circuit elements 111, 115, 119, 132, and 116, to provide another output signal, at a terminal 120.

The terminals 118, 120, which have DC signals received from the right-side and the left-side coils 97, 95 respectively of the front-end receiving antenna 91, are shown also on FIG. 13. Four antenna input lines are not shown for clarity of presentation. They are the rear-end receiving antenna 91 inputs and analog inputs 160 and 167 from filters 158 and 166, described later. All six such inputs are connected to a multiplexed analog-to-digital (A/D) converter 135, which alternately converts signals on all input lines to eight-bit digital signals at an output bus 136.

Those digital signals are conducted to the vehicle's motion control processor 61. It is a Model DS5000 microprocessor manufactured by the Dallas Semiconductor Corporation.

Another input to the motion control processor 61 is received from an outer loop microprocessor 67, which is an Intel Corporation Model 80186 device. The AGVC 13 communicates with the outer loop processor 67. Data is transmitted between the AGVC 13 and the outer loop processor 67 by guide wires in the floor or by a radio link using an antenna 15.

Commands sent from the outer loop processor 67 to the motion control processor 61 include the desired vehicle speed and the ratio of the left and right wheel speeds, which controls the radius of curvature of travel.

However, when the terminal-positioning mode of the vehicle navigation and guidance system is being used the ratio of the left and right wheel speeds is 1.0. The speed command is the same to the left wheel as to the right wheel; corrective signals are generated from the receive antenna and are combined with the speed commands to force the vehicle to track the wire. Therefore, the vehicle follows the path of the guide wire regardless of the path's layout (e.g., a non-straight path). Microcomputer programs for speed control of wheels of automatic guided vehicles are well known in the prior art.

In one travel direction, the port and starboard wheels delineate left and right direction, as is true when the vehicle is traveling in the forward direction. However, when the vehicle is traveling in the rearward direction, the port and starboard wheels delineate opposite hand directions, right and left, respectively. For this reason, inputs 118 and 120 as seen in FIG. 13 are received from the starboard and port side of the vehicle and are processed as right and left direction signals, respectively.

Digital data from the motion control processor 61 is conducted to a digital-to-analog (D/A) converter block 133. The block 133 contains two D/A converters 133A and 133B for starboard and port signals respectively. The analog signal at each of their output terminals 122, 124 is connected through a summing junction 175, 177 to a motor controller 21, 19, to motors 17, 15, and the drive wheels 10, 8. See FIG. 14.

During operation of the vehicle at places away from a terminal the AGVC 13 and the outer loop processor 67 provide commands to the motion control processor 61, which supplies signals through the D/As 133A, 133B to control the motion of the vehicle via its controllers, motors, and drive wheels.

During operation in a terminal the antennas 97, 95 receive induced signals from a loop of wire 54 on the floor, and provide signals through the circuits of FIGS. 12A and 12B and the A/D converter 135 of FIG. 13, then through the motion control processor 61, terminals 122, 124, junctions 175, 177, controllers 21, 19 (FIG. 14) and motors 17, 15. These error signals alter the speed commands of their respective wheels to position the vehicle laterally as desired in the terminal.

Summary of Passive Loop Positioning Operation

To summarize, the terminal-positioning mode of the vehicle navigation and guidance apparatus guides the vehicle over a passive wire as follows:

First, microprocessors 61 and 67 receive a signal from the AGVC 13 notifying them that the vehicle 2 is entering a terminal such as terminal 11. The transmitting antenna 71 is turned on by means of the analog switch 70, FIG. 6, which is controlled by the microprocessor 61.

Signals from the receiving antennas 91 are preamplified. The right-coil and left-coil signals are conditioned with identical electronic circuits, so the following description covers only the right-coil signal. The right-coil signal is routed through two different paths, namely the circuits of terminals 118 and 155, FIG. 14.

Figure 14:
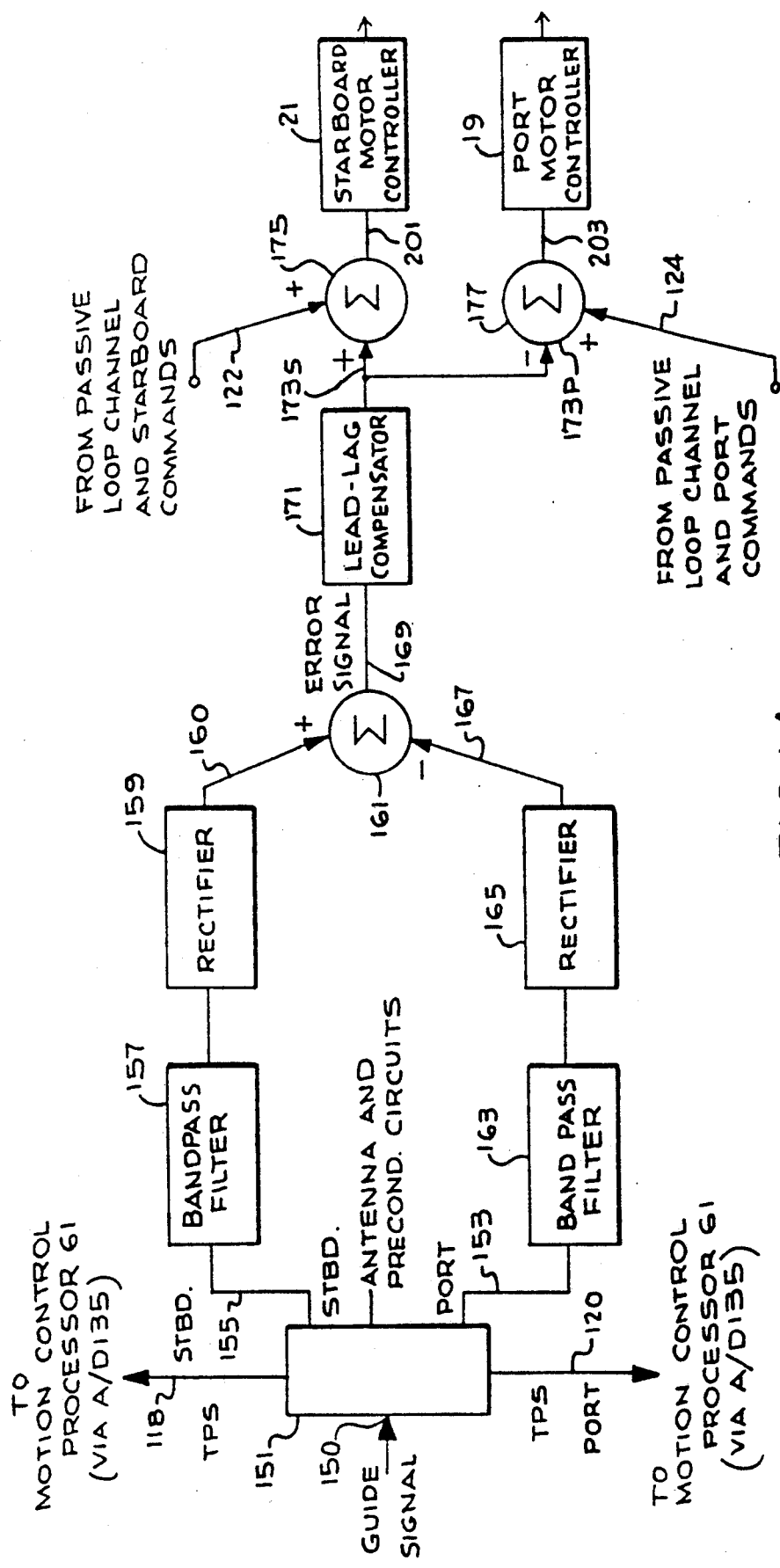
FIG. 14. Block diagram of equipment for guide-wire-tracking mode of operation of the vehicle. (See FIGS. 15-17 for details.)

Within block 151 of FIG. 14, the right-coil signal is routed to a bandpass filter, rectified, inverted and added to (i.e., offset by) a bias, and amplified to obtain the signal at terminal 118. It is also routed to an attenuator to obtain the signal at terminal 155.

The signal at 118 goes through a path including the motion control processor 61, (and necessary A/D and D/A converters), FIG. 13. The signal at terminal 155 is amplified in a bandpass filter 157 and then rectified (159), and no bias is removed, leaving the difference at terminal 160 very small. Consequently the error signal is very small. The signal at 169 is switched off by the outer loop processor 67 while the vehicle is traveling in over a passive guide wire, to eliminate any possible undesirable effects. (See switch 170, FIGS. 4B and 16B).

Lateral Positioning of Vehicle over Active Guide Wires at Terminals and Elsewhere In the case of terminals such as terminal 9 of FIG. 1 that are approached on routes such as routes 3 of FIG. 1 (which have guide wires embedded in the floor), guide wires are used in the floor of the terminals also, to position the vehicle within the terminal. FIG. 13 shows receiving equipment on the vehicle for guide-wire operation both inside and outside a terminal, so far as lateral positioning of the vehicle is concerned.

As shown in FIG. 14, guide signals from a wire in the floor enter (at terminals 150) a block labeled "Antenna and Preconditioning Circuits" 151. Portions of this block 151 were already described in connection with FIGS. 12A and 12B, where terminals 118 and 120 are shown. Other portions of the block 151 will be described subsequently in connection with FIG. 15, but for purposes of explaining the general concept it is helpful to finish describing the block diagram of FIG. 14 first.

The Antenna and Preconditioning Circuits block 151 outputs an AC signal at a terminal 155, which goes to a bandpass filter 157. This filter is tunable to either guide-wire frequency, specifically 965 Hz or 1155 Hz. Two guide-wire frequencies are available to enable commanding the vehicle to select either one of two guide-wire paths at a fork.

The outer loop processor 67 alternates the center frequency of this bandpass filter 157 by means of an analog switch, which switches appropriate resistor values into the circuit to select the desired frequency, until a significant amplitude is detected, signifying acquisition of the guide wire. The filtered signal is fullwave rectified in a block 159. The result at terminal 160, which is from starboard signal channel, is sent to a non-inverting input of a summing junction 161.

A port channel output from the block 151 is at terminal 153. It is passed through a bandpass filter 163, then through a fullwave rectifier 165. At a terminal 167 it is entered into an inverting input of the summer 161. The output of the summer 161, at terminal 169, is an error signal. That error signal is passed through a lead-lag compensator 171, which is tailored to the dynamics of the system as a whole to provide stability, fast response, and high accuracy.

The output of the lead-lag compensator 171 is inverted and added to the starboard speed command 122 from the D/A 133A of FIG. 13 at summer 175. See also FIG. 4A for a broader view. The summer 175 outputs a signal at a terminal 201, which is connected to the starboard motor controller 21. That motor controller controls the motor 17 which drives the wheel 10, as described earlier.

The output from the lead-lag compensator 171 is connected also to another summer 177 without being inverted first. Summer 177 adds the compensated error signal 171 to the port speed command 124. The summer 177 outputs a signal to the port motor controller 19, which drives the port motor 15, hence the wheel 8. The elements 157 through 177 are on an analog circuit board.

Figure 15:
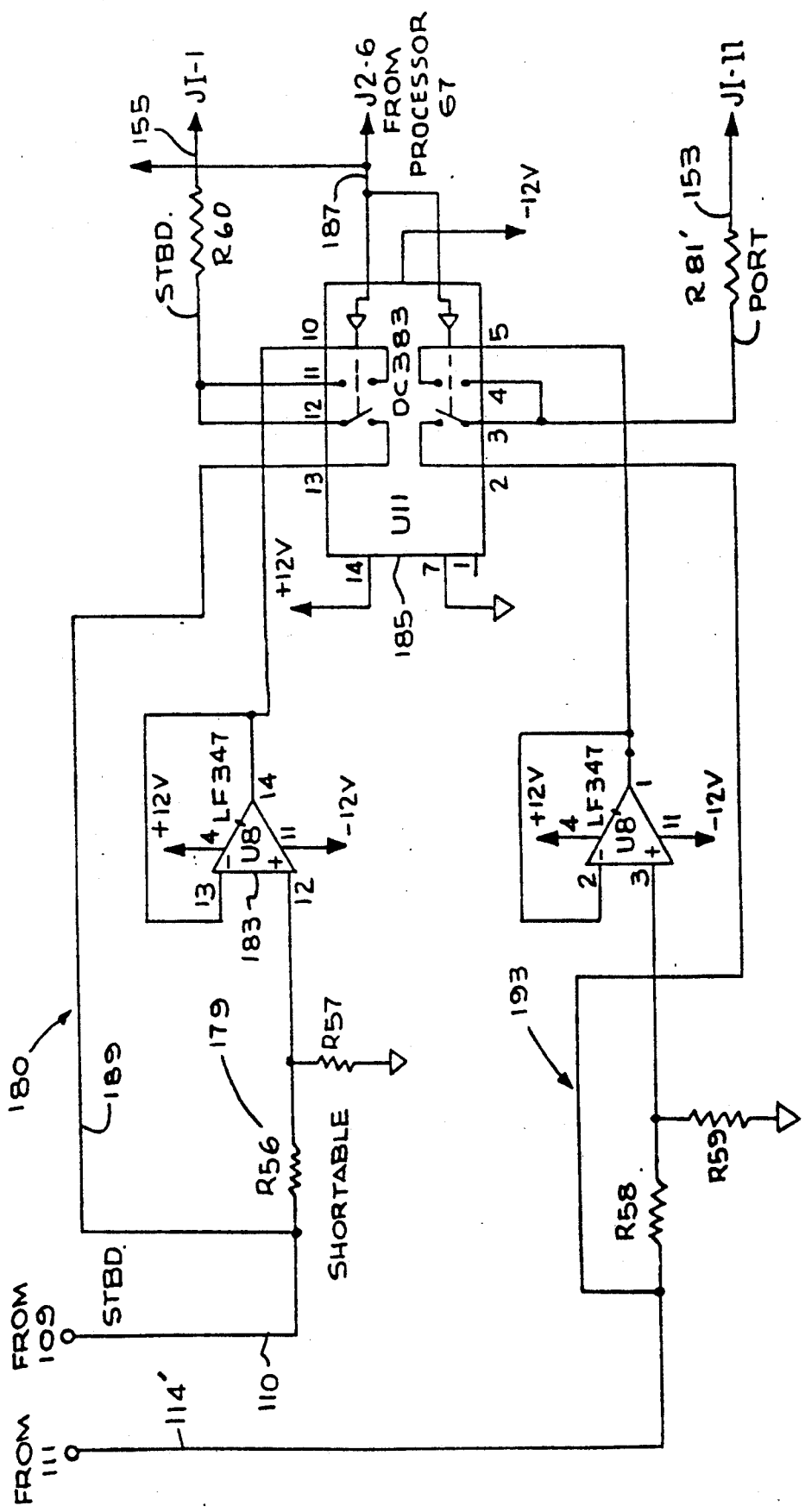
FIG. 15. Diagram of circuits including the receiving antennas, their preamplifiers, and short-circuitable attenuators (input portion of circuit) as used when the vehicle is relying on an active guide wire for position information.

Details of the lateral-control circuits on the vehicle for a guide-wire mode of operation are shown in FIGS. 15, 16 and 17, which will now be described. FIG. 15 shows connections 110, 114' from the preamplifier 109, 111 that were shown on FIGS. 12A. The signal from preamplifier 109 goes to an attenuator 180 consisting of resistors 179, 181, and an amplifier 183.

That attenuator is arranged so that it can be short-circuited by an analog switch 185 upon receipt of a control signal (at a switch terminal 187) from the outer loop microprocessor 67. A short-circuiting conductor 189 is connected around the attenuator 180. One output of the analog switch 185, which is a double-pole double-throw selector switch, is at a terminal 153, for the port side signal.

In an identical way, the output of preamplifier 111 goes to a switchable attenuator 193 and through the analog switch 185 to an output terminal 155 for the starboard side.

In FIGS. 6 and 15 the analog switches 70 and 185 are arranged such that when the oscillator 168 is disconnected from the transmit antenna 71, the attenuators 180, 193 are short-circuited and do not attenuate. This situation occurs when the vehicle is relying on active guide wires for guidance.

At other times, the oscillator 68 feeds the transmitting antenna 71 (via switch 70) and the attenuators 180 and 193 are permitted (by switch 185) to attenuate the signals received from antenna coils 97 and 95. This situation occurs when the vehicle is relying on passive guide wires for guidance.

Terminals 153 and 155 are at the left of FIG. 16A, which shows a middle portion of analog circuits for receiving an processing signals when operating in the guide-wire mode. The starboard signal at terminal 155 of FIG. 16A is conducted through a switch to a bandpass amplifier filter 157, which is tuned to one of the guide-wire frequencies, i.e., 965 Hz or 1155 Hz. The output of bandpass filter 157 is rectified in rectifier 159, smoothed in filter 158 and sent to a summing junction 161.

At the same time the signal 153 of FIG. 16A passes through a bandpass filter 163, through a rectifier 165 and an amplifier 166, and is connected to another input terminal 167 of the summer 161. The output of summer 161, at terminal 169, passes through the lead-lag compensator 171 to the terminal 173.

Figure 17A:
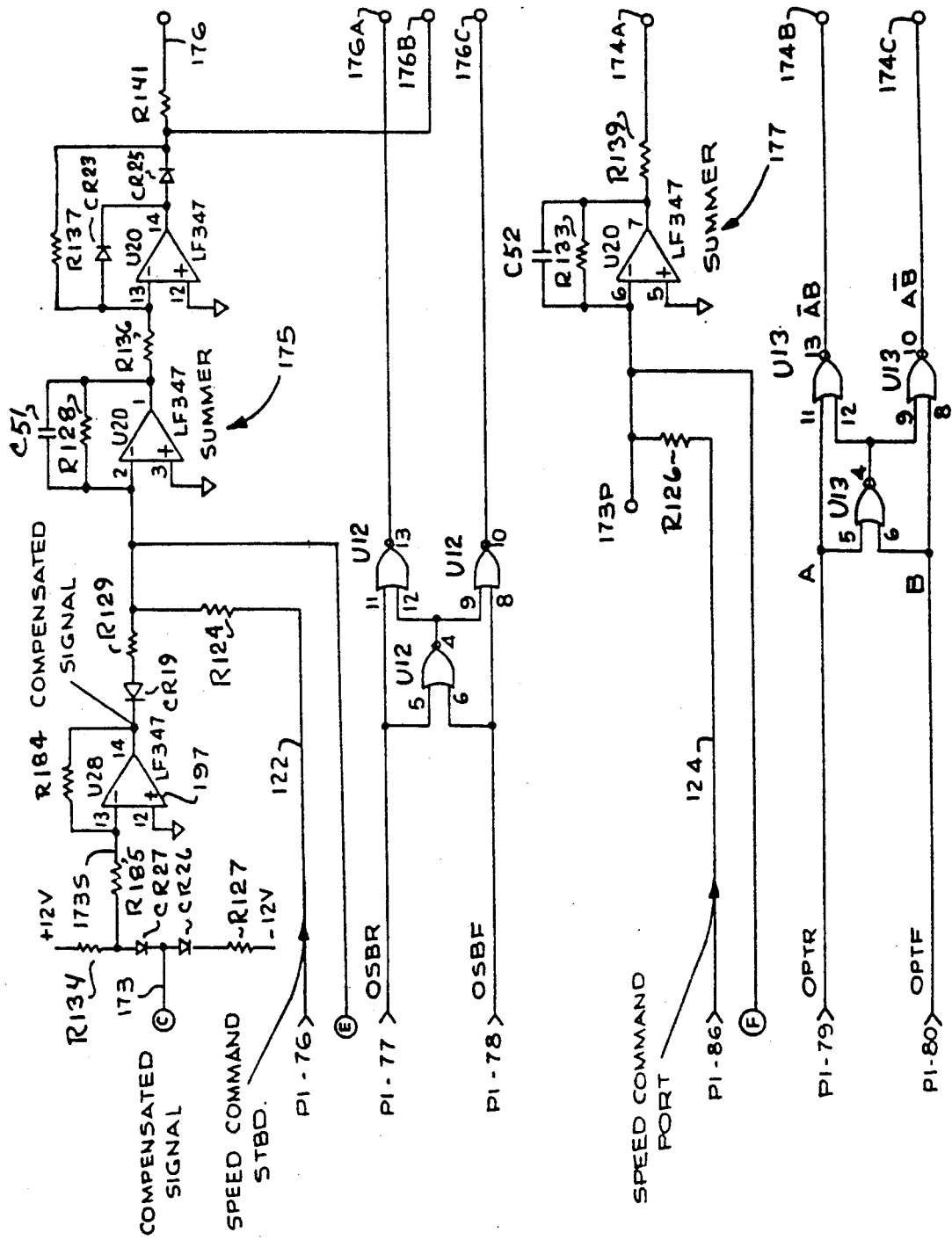
FIG. 17A. Circuit diagram, a continuation of FIG. 16B, of a portion of an analog board that sums a command from the motion control microprocessor with a compensated error signal, and drives a motor controller.
Figure 17B:
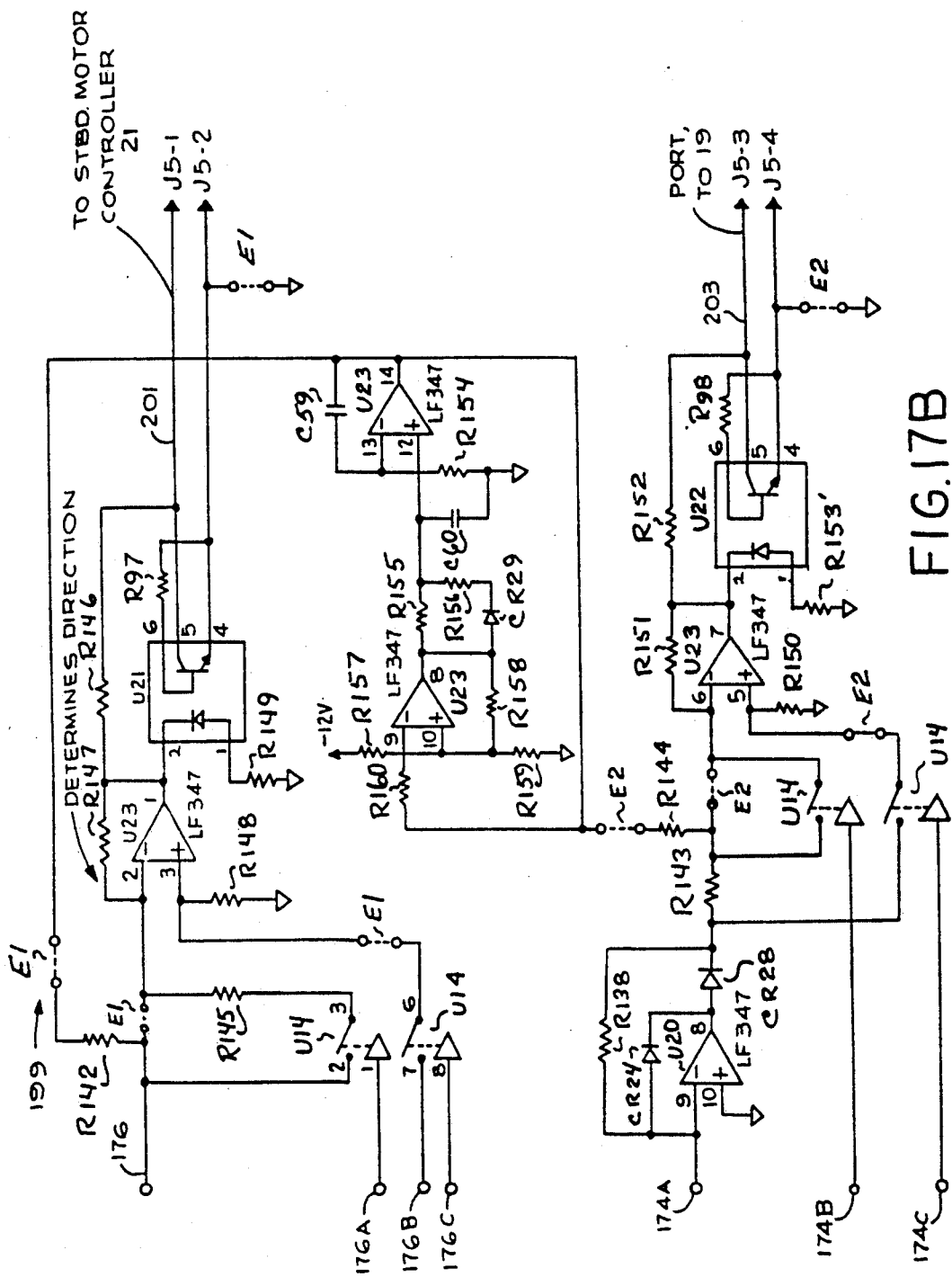
FIG. 17B. Circuit diagram, a continuation of FIG. 17A, of a portion of an analog board that controls direction of the vehicle (forward or reverse), and drives a motor controller.

In FIGS. 17A and 17B circuits are shown that follow FIG. 16B and are output portions of an analog board. These output portions sum the commands at terminals 122 and 124 from the microprocessor 61, with the compensated error signal at terminal 173 that drives the motor controllers. A signal of FIG. 17A at terminal 173 splits into terminals 173S and 173P. The starboard signal at 173S is inverted in device 197 and summed with the starboard speed command 122 at summer 175, then passes through some circuits 199 merely to select a forward or reverse direction of motion. It flows to an output terminal 201 that goes to the starboard motor controller 21. The circuits of this figure are of a conventional nature so their details are omitted from this description, although they are shown in detail in the included drawings.

The signal at terminal 173P of FIG. 17A is not inverted but is connected directly to a summer, 177, and passes through circuits similar to those just described to send a signal, at a terminal 203, to the port motor controller 19, as shown on FIGS. 14, 17A, and 17B. Junctions between FIGS. 17A and 17B are designated 174A, 174B, 174C, 176A, 176B, and 176C.

Operation of the Motion Control Processor

The following equations describe the operation of the microprocessor 61. The speed commands $C_s(n)$ and $C_p(n)$ are signals that originate from the AGVC 13 and that are sent from the outer loop microprocessor 67 to the motion control processor 61. These signals are added in microprocessor 61 to the compensated error signal $e_c(n)$ to yield the resultant signals $R_s(n)$ and $R_p(n)$, which serve as inputs to the summers 175 and 177, at terminals 122 and 124 of FIG. 14.

The quantity $e(n)$ is a measure of how far the vehicle is off-center from the floor wire; a zero value of $e(n)$ means that the vehicle is centered over the wire. The $e(n)$ signal could be programmed to call for an offset. If the floor wire were at an incorrect position laterally, the fault could be compensated by having the program cause the vehicle to operate off to one side of the wire. For example, the vehicle could be offset by two inches by simply adding a term to the error signal $e(n)$.

The term $e_c(n)$, which is the compensated error signal, is the output of a digital filter in microprocessor 61 that provides dynamic loop compensation of the closed control loop. It involves the current value and recent values of the error signal $e(n)$, as well as recent values of the compensated error signal $e_c(n)$.

The loop control equations that are implemented by microprocessor 61 are as follows:

$C_s(n)$ = speed command for starboard motor 17 at time n (originates from AGVC 13).

$C_p(n)$ = speed command for port side motor 15 at time n (originates from AGVC).

where n = time index, which is incremented sequentially.

$A_r(n)$ = signal received from terminal-positioning mode of the vehicle navigation and guidance system antenna of the right coil at time n, and processed. (Terminal 136 of FIG. 13.)

$A_l(n)$ = signal received from terminal-positioning mode of the vehicle navigation and guidance system antenna of the left side coil at time n, and processed.

$e(n)$ = error in lateral position of vehicle relative to the lateral offset position which is relative to the floor wire, as earlier described.

$$e(n) = K_1 A_l(n) - K_2 A_r(n) + L_t$$

where $K_{1,2}$ = gain, which is to be determined in each design case.

$L_t$ = lateral offset for a selected terminal $e_c(n)$ = dynamically compensated error signal at time n.

$$e_c(n) = a_1 e_c(n-1) + a_2 e_c(n-2) + a_3 e(n) + a_4 e(n-1) + a_5 e(n-2).$$

where $a_i$ = constant coefficients, selected for stability compensation of the closed-loop system. i = 1–5.

$R_s(n)$ = resultant command for starboard motor 17 at time n.

If $e_c(n)$ is less than zero, then $$R_s(n) = C_s(n) + e_c(n);$$

else $R_s(n) = C_s(n)$. An output of the microprocessor 61. Starboard input to the summer 175. See FIG. 14.

$R_p(n)$ = resultant command for port-side motor 15 at time n.

If $e_c(n)$ is greater than or equal to zero, then $$R_p(n) = C_p(n) - e_c(n);$$

else $R_p(n) = C_p(n)$. An output of the microprocessor 61. Port-side input to the summer 177.

Tests performed as described above assure that the resultant commands are always less than the speed commands.

Summary of Guide-Wire Tracking

To summarize, the terminal-positioning mode of the vehicle navigation and guidance system apparatus guides the vehicle on a guide-wire portion 3 of an installation in the following manner. The transmitter assembly 68, 69, 71 is turned off by means of the switch 70 of FIGS. 5 and 6. Signals from guide wires, received at the receiving antenna 91, are preamplified (FIG. 15) and routed directly to an analog circuit board (FIG. 14). The starboard and port signals $C_s(n)$ and $C_p(n)$ above replicate, with opposite signs, the commands being received at terminals 122 and 124 from the microprocessor 61. The summers 175 and 177 output speed commands, varied slightly by error signals, to control the motors 15 and 17 to drive the vehicle.

Use of the Vehicle Navigation and Guidance Apparatus in Two Guidance Modes—Namely Active Guide Wire and Self-Contained Navigation and Guidance Certain components are used in common, at terminals and elsewhere, by both the terminal-positioning mode of the vehicle navigation and guidance system for passive floor loops and the guide-wire guidance mode. The guidance system as a whole may have a portion of its routes (routes 3) in which vehicle guidance is provided by guide wires in the floor. The terminal-positioning mode of the vehicle navigation and guidance system can be used to track those floor guide wires.

The components that are used in common include the receiving antennas 47, the FIG. 17 portion of the analog board 49, the preamplifiers shown in FIG. 12A, the controllers 19, 21 of FIGS. 4 and 14, the motors 15 and 18 of FIG. 4A, and of course the wheels 8, 10.

Wire-Crossing Detection for Longitudinal Positioning of Vehicles

Longitudinal positioning of the vehicle 2A at terminal 9 or 11 is accomplished by sensing the location of the vehicle with respect to a wire that extends transversely across the floor in the terminal area. Current in the transversely-disposed conductor produces an alternating magnetic field surrounding it. The current can be due to active conductive energization of the wire or can be induced by transformer action from a transmitting antenna on the vehicle that generates a magnetic field. The magnetic field encircles the wire so that, at a particular instant, its direction is upward at one side of the wire, is horizontal directly over the wire, and is downward on the other side of the wire.

Magnetic coils for sensing the presence and location of the wire crossing are shown on FIG. 7. The three coils on the left side are a front coil 205, a middle coil 207, and a rear coil 209. The coils on the starboard side are: front 211, middle 213, and rear 215.

When these coils are in place on the vehicle their axes are vertical so that their turns are horizontal. Consequently when the middle coil 207 is directly over a current-carrying wire at the floor, magnetic flux passes through the front coil 205 in one direction, say upward, at the same time that magnetic flux passes through the rear coil 209 in the opposite direction, i.e., downward. At that same time flux in the coil 207 does not link any turns because the flux there is horizontal and the coil's turns are horizontal.

When the coil 207 is directly over the current-carrying floor wire, an alternating magnetic flux would therefore produce one phase of signal in the coil 205, an opposite phase of signal in the coil 209, and zero signal in the coil 207. The principle of operation of the apparatus in detecting the longitudinal location of the vehicle by means of wire-crossing detection is based on these three signals.

Figure 18:
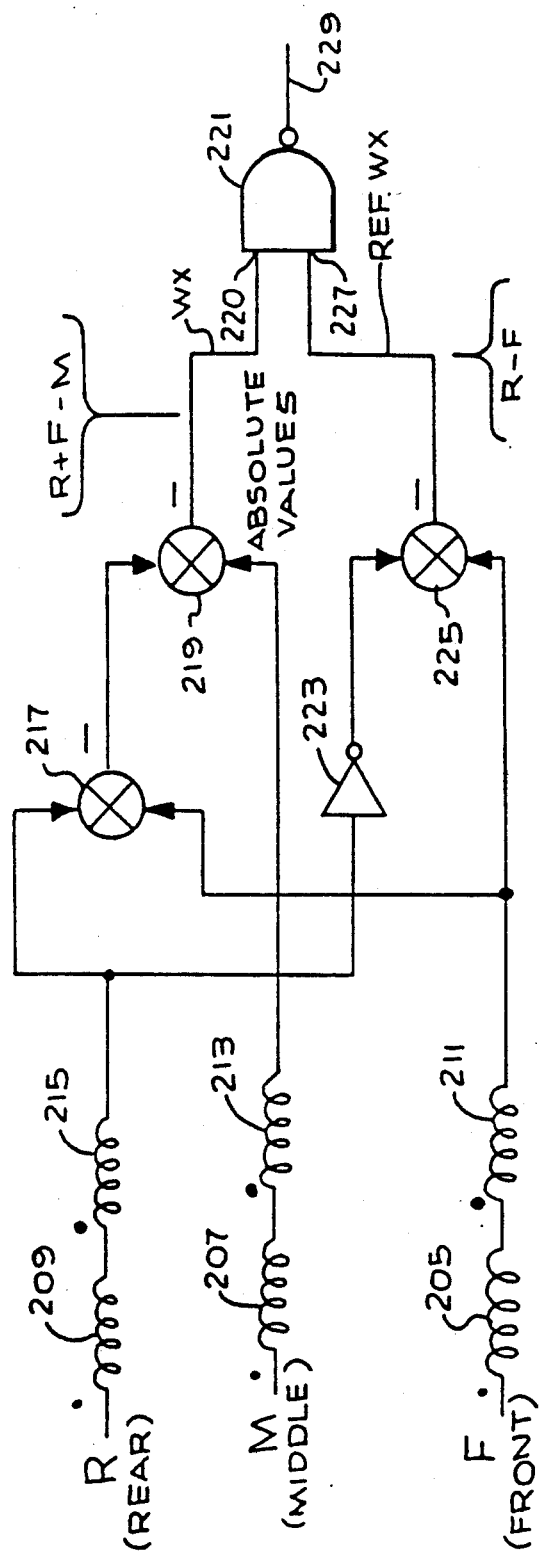
FIG. 18. Simplified diagram of wire-crossing detection circuits. (See FIG. 19 for details.)

The method of combining the three signals is shown in FIG. 18, which is simplified in order to illustrate the concepts. Signals can occur in either coil 209 alone, or 215 alone, or both simultaneously. A signal from coils 205 and 211 is added to a signal from coils 209 and 215 at a summer 217. The sum is inverted and added to a signal from the middle coils 207 and 213 at a summer 219. The output of summer 219 is inverted and applied as an input 220 to a NAND gate 221.

The signal from coils 209 and 215 is also inverted in an inverter 223 and is input to a summer 225. This signal is added to a signal from the coils 205 and 211 by summer 225. The output of the summer 225 is inverted and applied to a second input 227 of the NAND gate 221.

The signal at the first input 220 is a "wire-crossing signal" WX while the signal at terminal 227 is a "wire-crossing reference signal" REFWX. Absolute values of the signal WX and the signal REFWX are used at the terminals 220 and 227. The output of NAND gate 221 is terminal 229.

When a vehicle drives into a terminal it approaches a transversely lying wire 87 on the floor across the path of the vehicle. Only the left-hand coils will be discussed. Before the vehicle arrives at the wire, all three of the coils 205, 207 and 209 are linked by some alternating magnetic flux from the wire and all three of their signals are in phase. For simplicity of discussion, this phase is referred to as "downward" flux.

When the vehicle has advanced to where only the front coil 205 has crossed the wire on the floor, the coil 205 has "upward" flux and the coils 207 and 209 still have downward flux. That is, the instantaneous polarity of the output signal from the front coil 205 is opposite the polarity of the middle and rear coils 207, 209. When the vehicle has advanced to where the middle coil 207 is directly over the floor wire, coil 205 has upward flux, coil 207 has zero linking flux (because the flux is parallel to the plane of its coils), and the rear coil 209 has downward flux.

The signal at point 220 of FIG. 18 is the rear coil's signal plus the front coil's signal minus the middle coil's signal. When the middle coil 207 is directly over the floor wire 87 the signal from the front coil 205 is equal and opposite to the signal from the rear coil 209 so those terms cancel. At the same time the signal from the middle coil 207 is a minimum, so the signal at point 220 is zero. This represents a wire-crossing position.

At that time the reference signal at a point 227 is a maximum because that signal is the rear coil's signal minus the front coil's signal. Since the signals from these two coils 205 and 209 are of opposite polarity at that time, their algebraic difference becomes the sum of the magnitudes of the two, so it is a maximum.

The logic circuit involving NAND gate 221 and circuits leading up to it are arranged so that when the signal at 220 is crossing zero and the signal at 227 is relatively great (although not necessarily a maximum) and NAND gate 221 outputs a logic signal at the point 229 that is suitable for indicating that the vehicle is directly over the wire crossing. That output at 229 is low when a wire crossing is detected.

Figure 19:
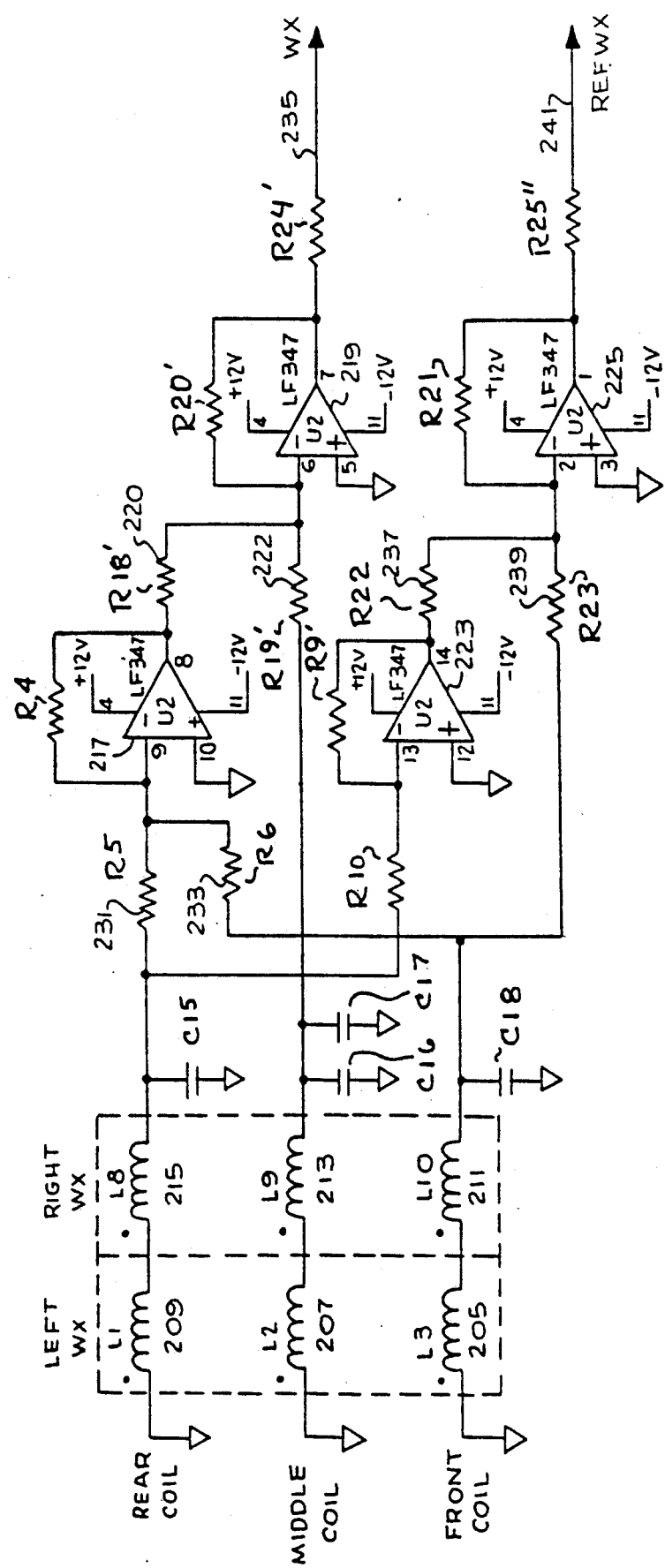
FIG. 19. Circuit diagram of wire-crossing detection circuits including antennas (i.e., coils) and signal-combining circuits.
Figure 20:
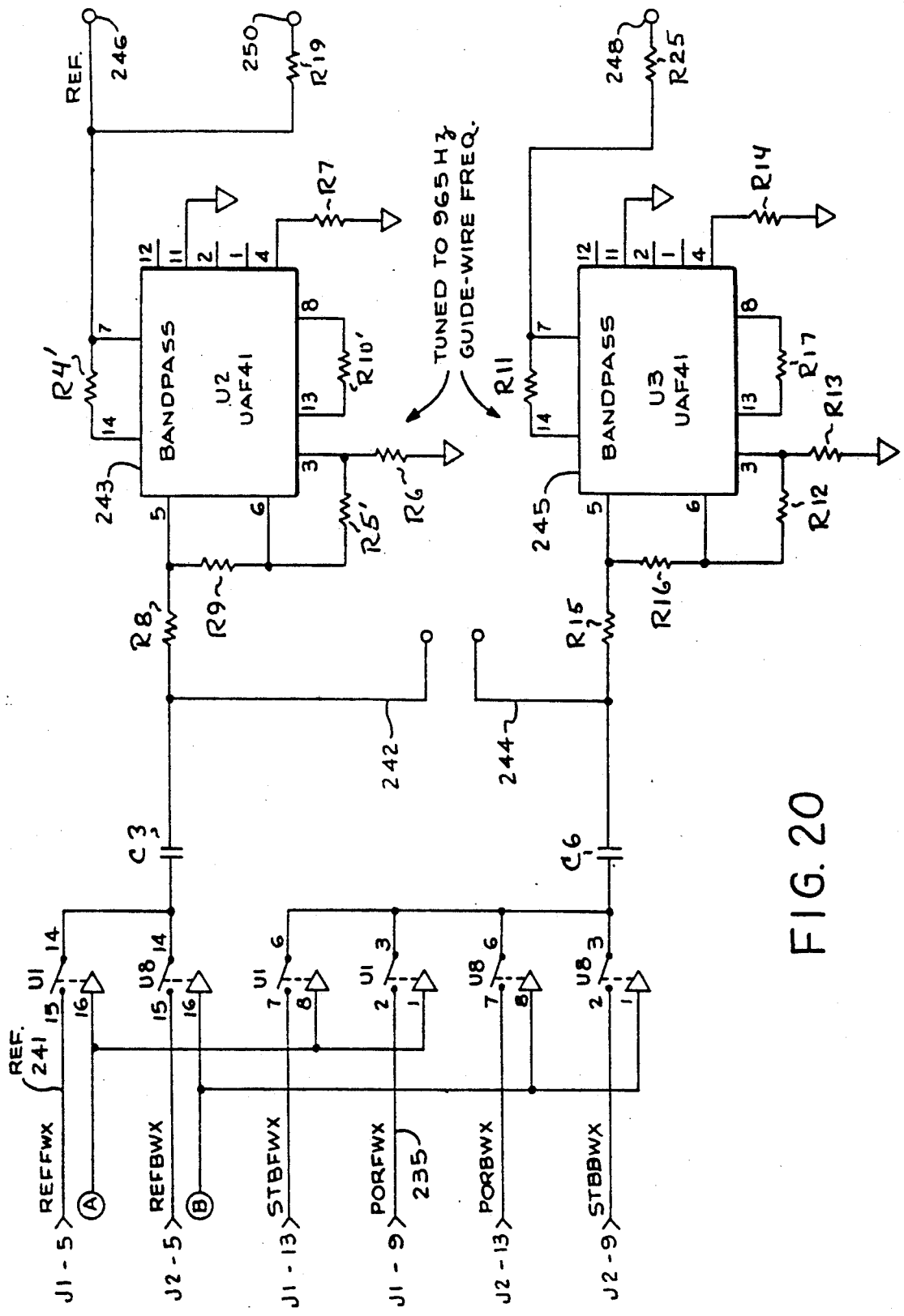
FIG. 20. Circuit diagram of a portion of wire-crossing detection apparatus tuned to a frequency assigned for active guide-wire operation of the vehicle.

Details of the wire-crossing circuits are shown in FIGS. 19 and 20, and some waveforms at selected points in the circuit are shown in FIGS. 23 through 27.

In FIG. 19 the coils 209 and 215 are in series and are connected through a resistor 231 to one input of an inverting summer 217. Coils 205 and 211 are connected in series, and are connected through resistor 233 to a second input of the summer 217. The output of the summer 217 is connected through a resistor 220 to one input of another summer 219. A second input to the summer 219 comes from a series connection of the middle coils 207 and 213, through a resistor 222. The inverted output of summer 219 is at a terminal 235, which is shown in both FIG. 19 and FIG. 20.

The output of coils 209 and 215 of FIG. 19 is connected also with an inverter 223, whose output is connected through a resistor 237 to an input of the summer amplifier 225. Another input of the summer amplifier 225 comes from the series-connected coils 205 and 211, through a summing resistor 239. The summer amplifier 225 is connected so as to invert the sum signal.

The output of inverting amplifier 225 is at terminal 241, which is shown on both FIG. 19 and FIG. 20. The signal at terminal 235 is the wire-crossing signal itself and that at 241 is the reference wire-crossing signal. The circuits of FIG. 19 are used in common to detect wire crossings that are (a) directly energized as in terminal 9 of guide-wire routes 3, and (b) passive induction loops as at terminal 11.

On FIG. 20 the signals at terminals 235 and 241 are connected through switching to bandpass filters 243 and 245. They are tuned to receive 965 Hz, which is the active guide wire frequency. A similar other subcircuit, of FIG. 22, to be described later, is tuned to 1155 Hz, which is the frequency of the transmitter on the vehicle that is used for exciting passive loops in the floor mat at a terminal. The 1155 Hz circuit is connected at terminals 242 and 244.

Figure 22:
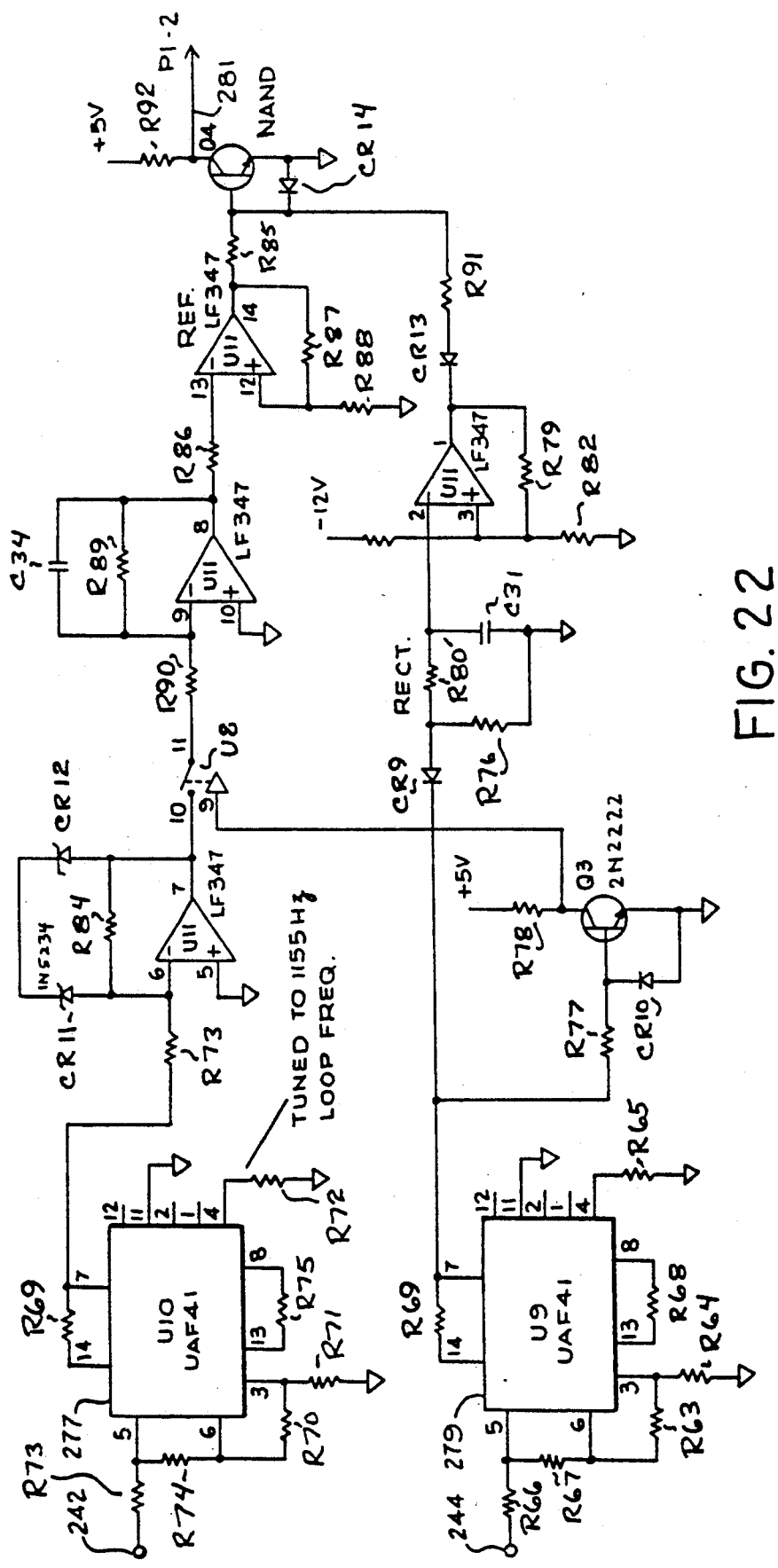
FIG. 22. Circuit diagram of a portion of wire-crossing detection apparatus tuned to a frequency assigned for passive wire loop operation in a terminal.

The two frequencies 965 Hz of FIG. 20 and 1155 Hz of FIG. 22 are used in a guidewire system for causing the vehicle to branch to a first or second route at a junction such as a "T", by applying an appropriate frequency to the guidewire when the vehicle approaches the junction. However, in a terminal having a passive loop, the receiver subchannel of 1155 Hz frequency is used for detecting a passive loop signal, whose energy originated with the onboard transmitter 68, and the receiver subchannel of 965 Hz frequency is used for detecting a conductively energized active guidewire crosswire at the terminal.

Thus the 1155 Hz passive-wire-crossing subchannel 277 (see FIG. 4), is used for detecting a passive loop when the vehicle is in a terminal, and is used for detecting a junction guide wire when the vehicle is not in a terminal. The 965 Hz guide-wire-crossing subchannel 243 of FIG. 4 is dedicated to only guide-wire sensing, both in and out of terminals.

Figure 21:
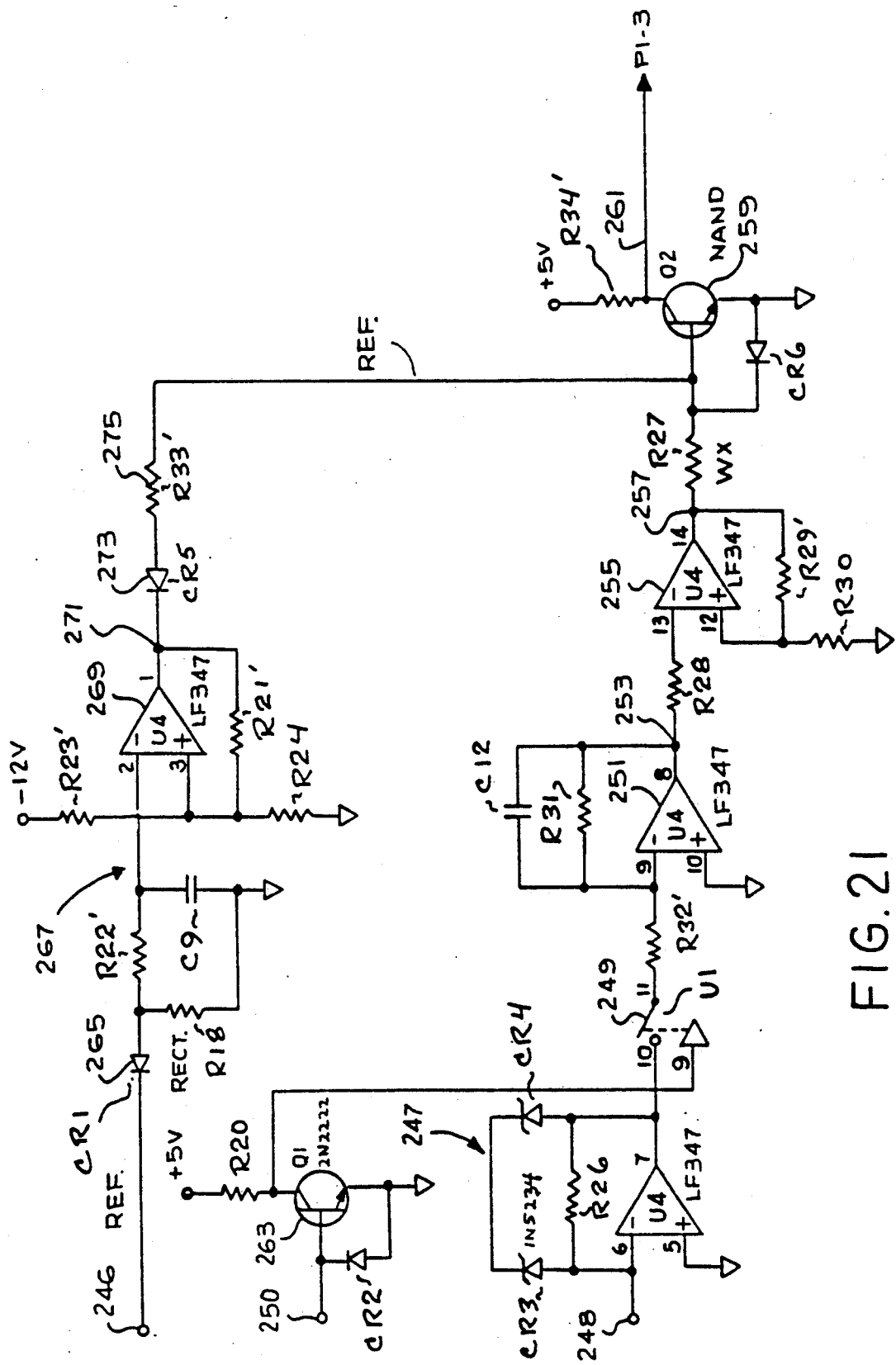
FIG. 21. Circuit diagram, a continuation of FIG. 20, of a portion of wire-crossing detection apparatus tuned to a frequency for active guide-wire operation.
Figure 23:
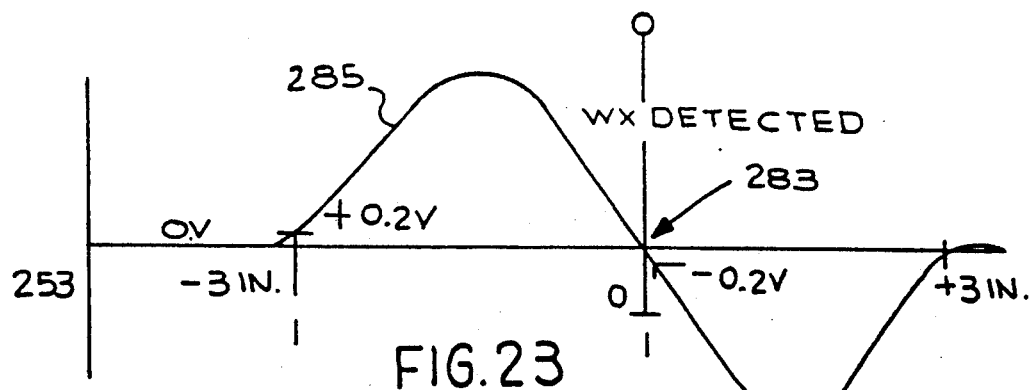
FIGS. 23-27. Signal waveforms at various points in the wire-crossing detection circuit of FIG. 21, namely at terminals 253, 257, 267, 271, and 261, respectively.

On FIG. 20, the signal of terminal 235 passes through switching to a bandpass filter 245. FIG. 21 is a continuation, at terminals 246 and 248, of FIG. 20. The output of filter 245 passes through an amplifier circuit 247, a switch 249, and an inverting amplifier 251. The output of inverter 251 is shown in the graph of FIG. 23. That graph is the detected wire-crossing signal at a terminal 253.

Figure 24:
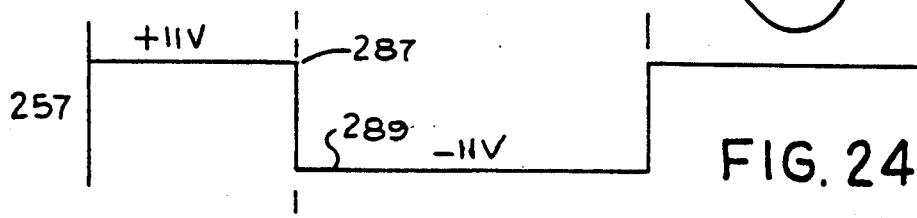

That signal passes through an amplifier 255 that eliminates the negative-going portion of signal and squares off the positive-going portion of the signal and inverts it, to produce the signal shown in the graph of FIG. 24. That signal appears at a point 257 of FIG. 21. It corresponds to the WX signal at terminal 220 of the simplified diagram of FIG. 18. Terminal 257 is connected to a transistor 259 in such a way as to perform a logical NAND function. The output signal, at terminal 261, is shown on the graph of FIG. 27.

On FIG. 20, the reference channel of terminal 241 goes to a bandpass filter 243. One output of the filter 243 goes via a terminal 250 to an amplifier 263 as shown on FIG. 21. The SPST switch 249 in controlled by the transistor circuit 263 and hence by the reference signal at 253. That reference signal turns on the cross-wire signal channel 251 when a strong reference signal is present and positive. (See FIG. 24).

The reference-channel bandpass filter 243 also outputs a signal through a diode 265 to an inverting input terminal 267 of an amplifier 269, FIG. 21. The waveform at input terminal 267 is shown on the graph of FIG. 25. It is a negative-going signal whose magnitude increases as the vehicle approaches the center of the cross wire and whose magnitude diminishes as the vehicle continues past the center. It is the algebraic sum of the outputs of the front and rear coils.

Figure 25:
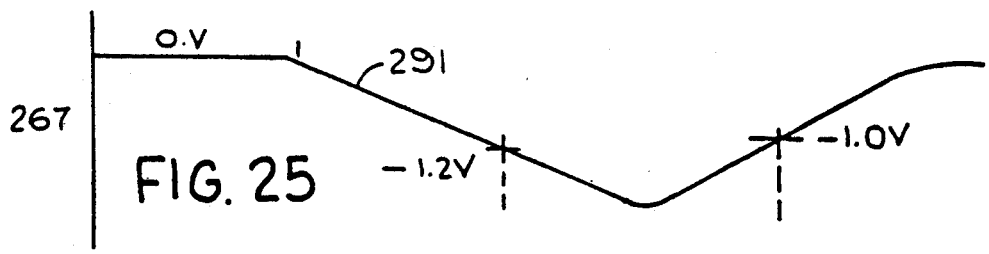
Figure 26:
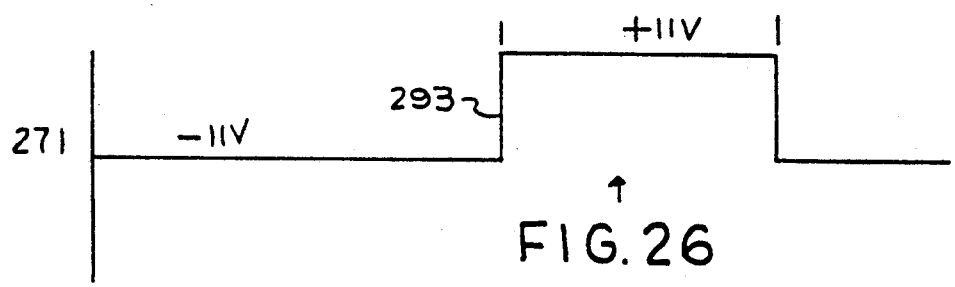
Figure 27:
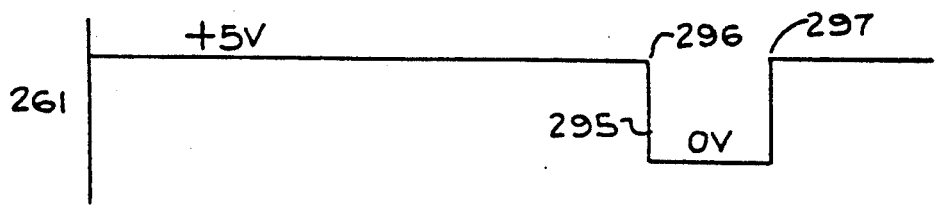

At a threshold of minus 1.2 volts the reference signal at 267 is tripped. Amplifier 269 is configured as a Schmitt trigger with about 0.2 volts of hysteresis. The threshold for decreasing magnitude is 1.0 volt, as shown in FIG. 25. This threshold is passed as the vehicle continues forward past the wire cross. The output of the amplifier 269, at a terminal 271, is shown as a large square graph 293 in FIG. 26.

The square graph 293, which has a range from negative 11 volts to positive 11 volts, is applied through a diode 273 and a resistor 275 to the base of transistor 259. That signal serves as the reference-channel input to the NAND gate whose principle component is transistor 259. Transistor 259 is part of the NAND gate 221 of the simplified diagram of FIG. 18.

The circuit of FIG. 22 has bandpass filters 277 and 279, both of which are tuned to 1155 Hz for passive loops. Otherwise, the circuit of FIG. 22 is identical to that of FIG. 21. The output of circuit 22 is at a point 281. This is the cross-wire signal output when a passive loop is used instead of an active guide wire.

The curves of FIGS. 23 through 27 are aligned vertically over each other to provide the same vehicle-position scale on the abscissa for al of them. Collectively they portray what happens in the circuit when a guided vehicle having antennas 205-215 as in FIG. 7 enters a terminal and drives over a wire-crossing that it must detect for purposes of longitudinally positioning the vehicle. The abscissa of all of the graphs of FIGS. 23 through 27 is distance expressed in inches, as measured positively and negatively from a zero point 283 on FIG. 23. Point 283 is the vehicle's position when the middle coil 207 is directly over the wire-crossing on the floor.

As shown in FIG. 23, at a distance of −3 inches, a curve 285, which is the wire-crossing signal at terminal 253 of FIG. 21, has increased to a +0.2-volt level. A Schmitt trigger 255 trips its output from positive saturation level to negative saturation level 289 at a point 287 in FIG. 24. The graph at FIG. 24 is the signal at terminal 257 of FIG. 21, as a function of the vehicle's longitudinal position.

On FIG. 23, when the curve 285 decreases (at a short distance to the right of the zero-point 283) to a level more negative than −0.2 volts, which is the negative threshold level os Schmitt trigger 255, the output signal at terminal 257 returns to a positive saturation level. The signal 289 essentially serves as one input of the NAND gate 259.

Turning now to the reference signal channel of FIG. 21, a signal at terminal 267 diminishes gradually from zero to a minimum at the wire-crossing center represented above by point 283. The waveform at terminal 267 of FIG. 21 is the V-shaped waveform 291 of FIG. 25. As the signal 291 decreases past −1.2 volts, amplifier 269 is triggered to saturate to the positive rail. Alternatively, as signal 291 increases past −1.0 volt, amplifier 269 is triggered to saturate to the negative rail. The output signal at terminal 271 is shown as waveform 293 in FIG. 26.

At the output terminal 261, a negative-transition pulse 295 is produced at a wire cross. As shown on FIG. 27, its leading edge 296 occurs at a place very slightly more positive than the zero center point 283 of the wire 87 on the floor. Its positive-going edge, if the vehicle were to continue in a forward motion, would occur at a position 297 on FIG. 27. The output signal at terminal 261 is a positioning signal whose edge 296 indicates that the middle coil 207 is almost directly over the wire-crossing. This signal goes to the motion control processor 61 to stop the vehicle and/or control its repositioning, by means of well-known computer control programming techniques.

Measurement of Heading of Vehicle, in One Embodiment of the Invention

In one preferred embodiment, one sensing antenna 47 is mounted at the front of the vehicle and another sensing antenna 47A is mounted at the back of the vehicle, as shown in FIG. 11. A measurement of the lateral offsets of the center of each of the antennas 47 and 47A from a central longitudinal wire segment 307 on the floor indicates the vehicle's heading. The net difference in offsets divided by the longitudinal spacing 308 between the antenna assemblies 47, 47A is the tangent of the heading angle of the vehicle relative to the wire 307.

The signals from antennas 47 and 47A are processed in the manner described in detail above and subtracted in a comparator 309 and entered into a portion 61A of the microcomputer 61. See FIG. 11. Stored in the microcomputer 61 is information as to the longitudinal spacing 308 between the two antennas, which enables the computer to compute the vehicle's heading.

Alternative Receiving System Embodiment Having Phase-Locked Loops

Figure 28:
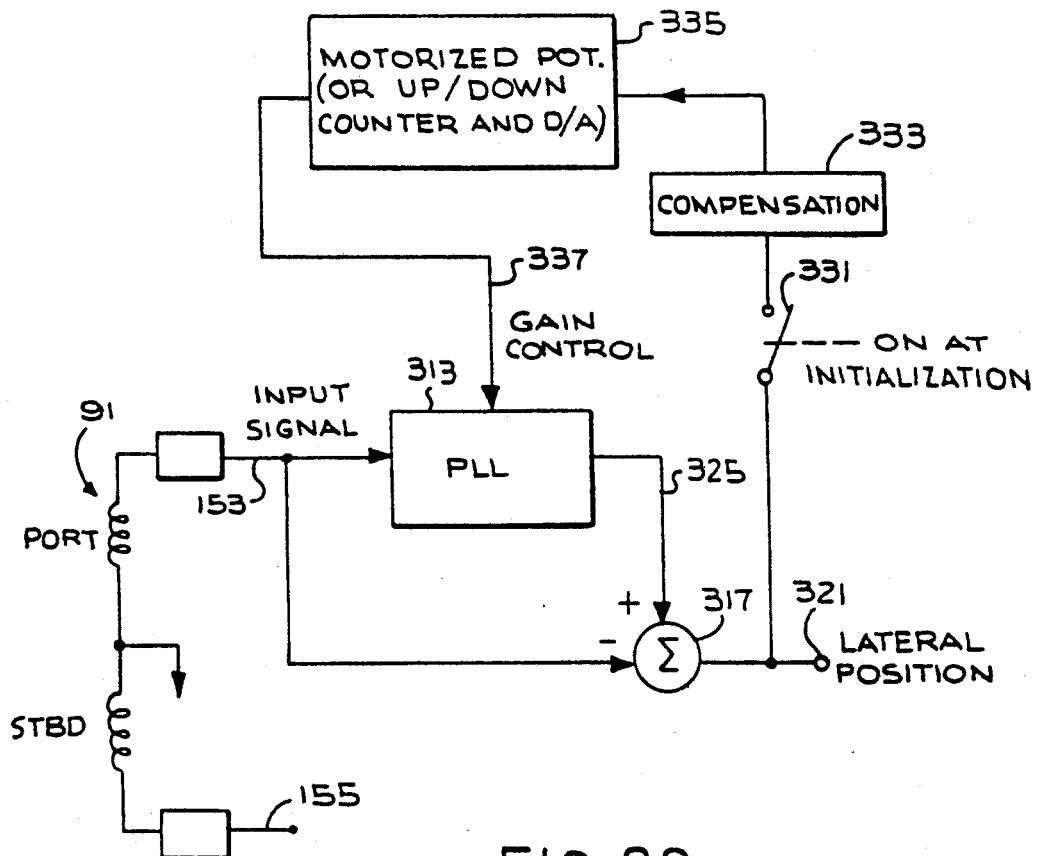
FIG. 28. Block diagram of an alternative embodiment of the invention that uses phase-locked oscillators in a portion of the system for processing signals from lateral-position-detecting antennas.
Figure 29:
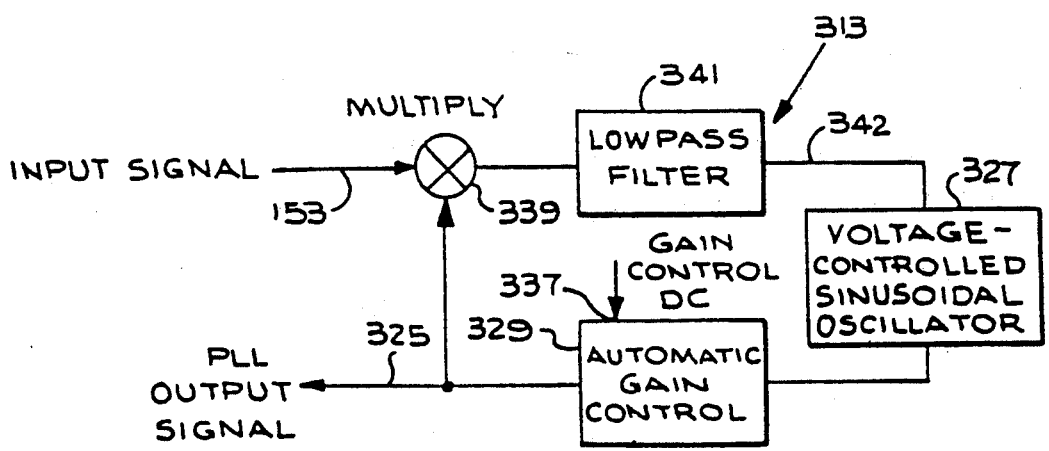
FIG. 29. Block diagram of a phase-locked oscillator having automatic gain control, used in FIG. 28.

An alternative embodiment of the apparatus for determining lateral position of a vehicle incorporates a phase-locked loop (PLL). FIGS. 28 and 29 shows this embodiment, which is an AC biasing system for compensating for (i.e., subtracting) the component of signal that is received at antenna 91 directly from the transmitting antenna 71.

The filtered and amplified signals from the lateral receiving antenna 91 are at terminals 153, 155 of FIGS. 15 and 28. The left-side signal at 153 is input to PLL 313 and subtracted in a summing amplifier 317 from the output (at 325) of the PLL 313, as shown in FIG. 28. The difference is a voltage at terminal 321, whose amplitude is approximately proportional to the vehicle's lateral position. The PLL 313 is shown in more detail in FIG. 29. The output 325 of the PLL 313 is the output of a sinusoidal voltage-controlled oscillator (VCO) 327, which is part of the PLL 313, as made clear by FIG. 29. The right-side signal at terminal 155 is processed by similar circuits.

The VCO 327 produces a signal whose phase is locked to the phase of the input signal 153. This is accomplished by multiplying the output of oscillator 327 (as modified by a gain-control circuit 329, under control of DC voltage at a terminal 337) in a multiplier 339. The output of 339 is a DC signal representative of the phase difference, or phase error, between the output of the VCO 327 and the input signal 153, and is attempted to be driven to zero by the PLL.

This DC signal enters a lowpass filter 341, whose output at 342 is used to control the phase of the VCO 327, (the oscillator's frequency being the time rate of change of its phase). This arrangement provides a final output signal at terminal 325, which is a robust AC signal having the same phase as that of the input signal 153. The circuit of FIG. 29 is block 313 of FIG. 28.

To make this alternative embodiment more refined, the automatic gain control 329 is employed during initialization to set up the amplitude of the output of the VCO 327 to be equal to the signal voltage at the terminal 153 under conditions described below.

The operation of the embodiment shown in FIGS. 28 and 29 is as follows. The phase of the left signal is tracked by the PLL 313 of FIG. 28 (and the phase of the right signal is tracked by a corresponding PLL). The PLL 313 provides at its output 325 a signal of preadjusted amplitude (which is set upon initialization), and of phase that tracks the phase of the received signal at terminal 155.

Initialization is performed far away from floor wires. The only input signal at that time is that which is induced directly in antenna 91 by a magnetic field produced by the transmitting antenna 71. To initialize the system a switch 331 is closed and a motorized potentiometer 335 (or alternatively an up/down counter and a D/A converter) are adjusted to achieve a DC level at terminal 337 such that the output signal of the PLL 313 is at a certain amplitude. That certain amplitude is the value at which the PLL's output signal 325 is exactly equal to the input signal 155 as determined by the summing amplifier 317.

The switch 331 is then opened. The motorized pot 335 remains in the position in which it was set during initialization. It continues to control the gain of block 329 via terminal 337 so that the amplitude of the output signal at 325 from the PLL 313 remains in the same as it was at initialization. If the signal 155 change sin amplitude, the lateral position signal at output 321 changes.

The signal at terminal 321 can be bandpass filtered, fullwave rectified, subtracted from the signal of the right-side receiving antenna, and used for control in the same manner as is shown starting with terminal 155 in the embodiment of FIG. 14.

Alternative Transmitting Antenna Placement

Figure 30:
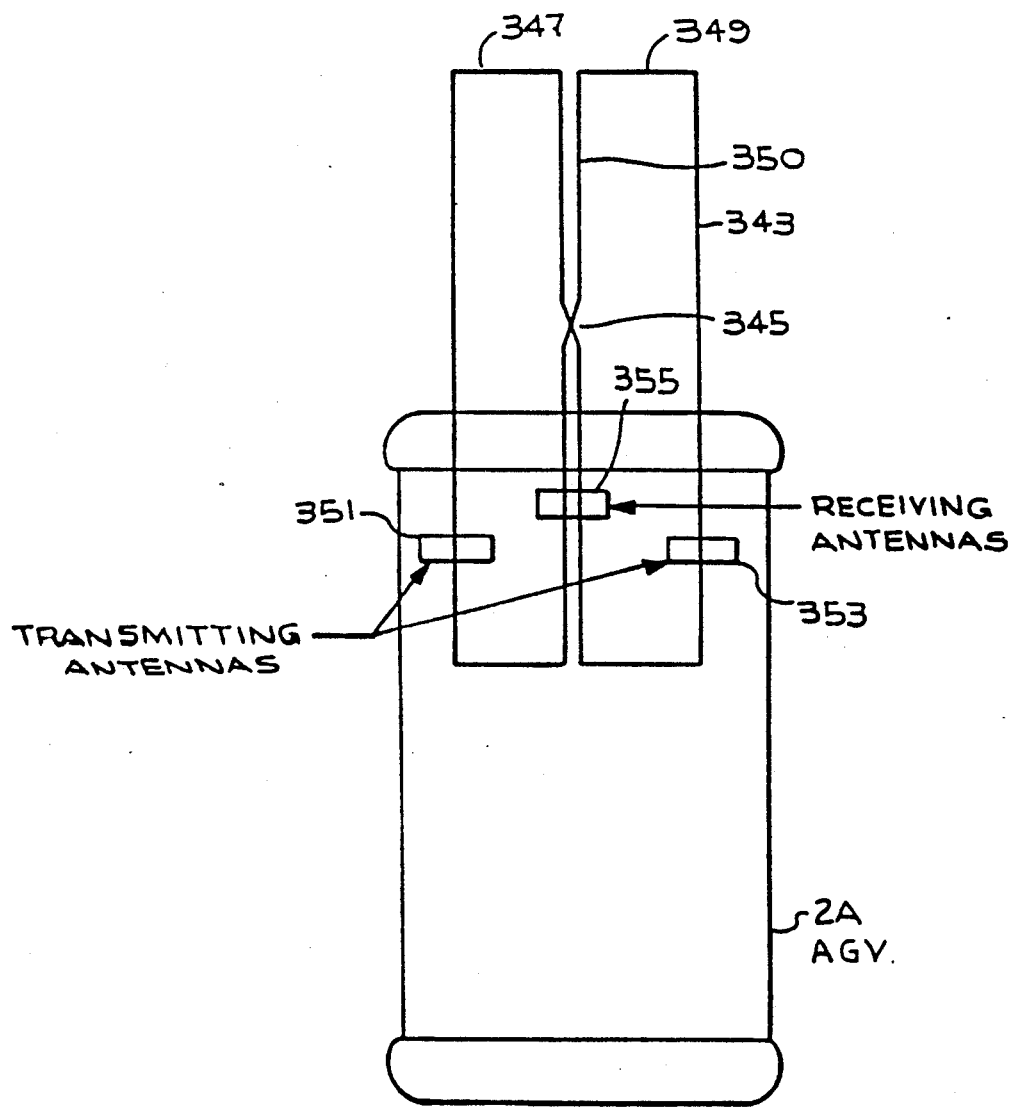
FIG. 30. Plan view showing an alternative embodiment having different transmitting antenna locations on a vehicle and a passive wire loop on the ground at a terminal, in which the two lobes of the passive wire loop are in a side-by-side configuration.

FIG. 30 illustrates an alternative technique for passive loop positioning of a vehicle in a terminal that is equipped with a passive loop. The passive loop 343 in this embodiment is a coil of wire with its ends connected together so as to form a closed loop, and which is flopped over at a point such as point 345 so that it form a left-hand loop 347 and a right-hand loop 349.

Magnetic fields produced by current in the loop reinforce, i.e., they are additive, in the center leg 350 where two wire segments lie close to each other. The transmitting antenna system comprises two antennas (coils) 351 and 353, on separate cores, which are spaced apart by an amount that places them over the outside legs of the folded loop 343. The coils 351 and 353 are phased so as to reinforce each other in inducing current in the loop 343. The receiving antenna assembly 355 is the same as was described earlier.

Another Embodiment

An alternative embodiment of the terminal-positioning mode of the vehicle navigation and guidance apparatus processes the received signals differently than described above. This alternative embodiment is adequately describable without a separate figure. It has equipment that subtracts the two rectified signals that come from the rectifiers 113, 115 of FIG. 12A. Their difference is a voltage approximately proportional to the lateral position of the vehicle. In this embodiment it is best for the two direct signals from the transmitting antenna assembly 71, which are received by the two receiving coils 95, 97, to be of equal strength. Equality of direct signals is achieved by adjusting the position of the receiving antenna assembly 91 with respect to the transmitting antenna assembly 71.

Automatic Bias-Setting Embodiment

An alternative embodiment provides automatic setting of the biases 129A and 129B of FIG. 12B; such automatic setting is a calibration step for the Proportional Positioning System. Bias setting compensates for an undesired offset of the receiving antenna's signal (see FIG. 7), caused by energy that is directly magnetically coupled from the transmitting antenna 71 to the receiving antenna 91 (i.e., energy not received via the passive loop 55).

The Proportional Positioning System is a portion of the AGV described elsewhere herein. It includes, as shown on FIG. 4B, the on-board magnetic transmitter 68, the passive loop 55, the lateral-position antenna of block 47, the lateral-channel preamplifier 109, the Passive Lateral Subchannel including terminals 113A and 118, and the A/D converter 135.

The preamplifier 109 is shown again in the more detailed schematic diagram of FIG. 12A, whose circuit is continued on FIG. 12B. FIGS. 12A and 12B, whose output is at terminal 118, depict only a manual bias-setting circuit, 129A and 129B.

In the alternative automatic embodiment now to be described, the signal at a bias terminal 361 is an automatically controlled zero-to-five-volt bias for offsetting the direct magnetic coupling component from the transmitting antenna 71. The automatic bias-setting circuit as a whole is a closed loop that, during calibration, provides whatever voltage is necessary at terminal 361 to make the voltage at terminal 362 equal zero.

The automatic bias-setting circuit makes precise adjustment of the location of the transmitting antenna unnecessary and enables easy compensation for aging of components, etc. Circuitry of this type is preferably provided for both of the receiving coils 95, 97.

Figure 31:
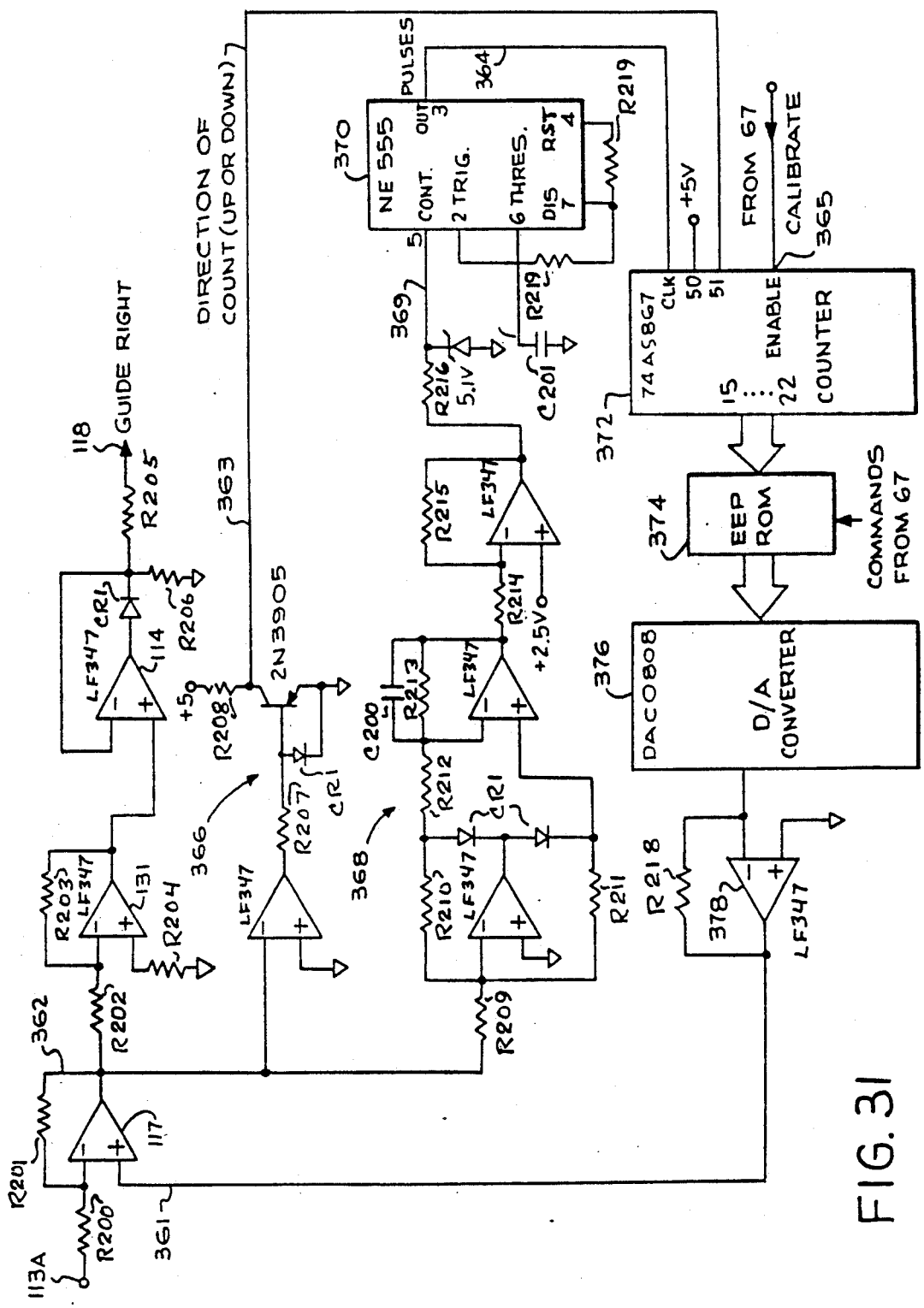
FIG. 31. A circuit diagram reproducing circuits from the top line of FIG. 12B and showing thereto connected circuits for calibration of an automatic offset adjust which compensates for offsets in antenna null measurements.

The components of the automatic circuit and their interconnections are shown in the circuit diagram of FIG. 31. To show how the circuit interfaces with the other AGV circuits, the top line of FIG. 12B is reproduced as the top line of FIG. 31, except with the automatic bias circuit replacing the manual bias circuit 129A.

As seen in FIG. 31, an analog signal at output terminal 362 of amplifier 117 is conducted to a digitizing circuit 366, which consists of an inverting amplifier and a transistor clipping circuit. Circuit 366 produces a logic 1 level at its output terminal 363 if the signal at terminal 362 is positive, and a logic 0 level at terminal 363 if terminal 362 is negative.

Terminal 363 is connected to a counter 372, which also has a clock input terminal 364 for receiving pulses that are to be counted. The direction of counting is determined by the logic level of terminal 363. The count is incremented upon occurrence of a clock pulse if terminal 363 currently has a logic 1, and decremented if terminal 363 has a logic 0. Counter 372 is a model 74AS867, manufactured commercially by the Company of Texas Instruments Inc., Dallas, Tex. 75265.

Another subcircuit 368 performs the function of generating clock pulse signals at a controllable frequency. The absolute-value circuit 368, whose input is at terminal 362, provides an analog voltage at an output terminal 369. The analog voltage at 369 is the magnitude of the signal of terminal 362, so terminal 369 is never negative, irrespective of the polarity of the bipolar signal at terminal 362.

Terminal 369 is connected to a voltage-controlled digital oscillator 370; it produces output pulses at a frequency that depends upon the control voltage at terminal 369. The oscillator 370 provides output pulses at a terminal 364, which are conducted to the clock input terminal of the counter 372. The oscillator 370 is a model NE555, manufactured commercially by Texas Instruments, Inc., Dallas, Tex., 75265.

The count contents of the counter 372 are connected to an EEPROM (Electronically Erasable Programmable Read-Only Memory) 374, which is optional in this circuit. The EEPROM is capable of storing the count when it is commanded to do so by the outer loop microprocessor 67. The output of the EEPROM is connected to a (digital-to-analog) converter 376, which is a model DAC0808, manufactured commercially by National Semiconductor Company of Santa Clara, Calif., 58090.

The analog output of the d/A converter 376 is inverted in an amplifier 378, whose output is connected to the bias terminal 361 of the amplifier 117.

Operation of the circuit is as follows. The calibration process is performed at a time when the vehicle is not over a wire. At such a time antenna 91 is not receiving any component of signal via wires on the ground. To start a calibration (bias setting) the outer loop microprocessor 67 sends a calibration-command bit to an "enable" terminal 365 of the counter 372.

If the voltage at terminal 362 is negative, the binary signal at terminal 363 is low, which causes the direction of counting of the counter 372 to be downward. The decreasing count passes through the EEPROM 374 and causes the D/A converter 376 to receive less input current, causing the voltage at the bias terminal 361 to increase. That makes the voltage at terminal 362 less negative, so that 362 voltage moves toward a null.

Conversely, if terminal 362 is positive, the signal at terminal 363 goes high, which causes the counter 372 to count upward, and causes the D/A converter 376 to receive more input current, causing the voltage of terminal 361 to decrease. Thereupon, the voltage at terminal 362 decreases toward zero.

The frequency of pulses at the clock input terminal of the counter 372 depends inversely upon the magnitude of the voltage at terminal 362; a greater magnitude results in a greater frequency of the pulses that are counted by the counter 372. Consequently the offset calibration signal at terminal 361 approaches a final value faster when it has farther to go. It reaches a final value when the voltage at terminal 362 is zero, which reduces the counting rate at terminal 364 to zero. The counter 372 retains its count contents, so the proper bias voltage remains on the bias terminal 361.

If the optional EEPROM 374 is provided, the vehicle need not be calibrated anew every time it is started. After a calibration the EEPROM is commanded by the outer loop microprocessor 67 to read the output of the counter 372 and store the value in its memory. The EEPROM therefore can reproduce the count that was in the counter 372 just before the power was turned off, and if it is still an appropriate value the calibration need not be repeated.

The following table comprises a list of components and component types or values for circuits seen in FIGS. 6, 12A, 12B, 15, 16A, 16B, 17A, 17B, 18, 19, 20, 21, 22, and 31:

| Component | Value |
|---|---|
| Capacitors | |
| (units in micro-Farads unless otherwise noted) | |
| C3 | .22 |
| C6 | .22 |
| C9 | .1 |
| C9' | .01 |
| C10 | 2.2 |
| C12 | 1 |
| C15 | .27 |
| C16 | .22 |
| C17' | 1 |
| C19 | 10 |
| C20 | 10 |
| C21 | 10 |
| C22 | 10 |
| C23 | 10 |
| C24 | 10 |
| C25 | .847 |
| C27 | 10 |
| C28 | .047 |
| C28' | 8.8 |
| C29 | 10 |
| C31 | .1 |
| C31' | 8.8 |
| C32 | 10 |
| C34 | .1 |
| C35 | .1 |
| C38 | 10 |
| C38' | 2.2 |
| C41 | .22 |
| C47 | 2.2 |
| C48 | 4700 |
| C49 | .022 |
| C50 | .1 |
| C51 | .0047 |
| C52 | .0047 |
| C59 | .847 |
| C60 | .047 |
| C61 | .22 |
| C67 | 2.2 |
| C68 | 4700 |
| C69 | .022 |
| C70 | .1 |
| C72 | 10 |
| Diodes | Value or Type |
| CR1 | 1N4148 |
| CR2 | 1N4848 |
| CR3 | 1N5234 |
| CR4 | 1N5234 |
| CR5 | 1N4148 |
| CR6 | 1N4148 |
| CR8 | 1N4148 |
| CR10 | 1N4148 |
| CR11 | 1N5234 |
| CR12 | 1N5234 |
| CR13 | 1N4148 |
| CR14 | 1N4148 |
| CR17 | 1N4148 |
| CR18 | 1N4148 |

-continued

| Component | |
|---|---|
| CR19 | 1N4148 |
| CR23 | 1N4148 |
| CR24 | 1N4148 |
| CR25 | 1N4148 |
| CR26 | 1N4148 |
| CR27 | 1N4148 |
| CR28 | 1N4148 |
| CR29 | 1N4148 |
| CR30 | 1N4148 |
| CR31 | 1N4148 |
| CR32 | 1N4148 |
| Switches and Gates | Type |
| U1 | LF11202D |
| U8 | LF11202D |
| U12 | 7402 |
| U13 | 7402 |
| U14 | LF11202D |
| U17 | LF11202D |
| U24 | LF11202D |
| U29 | LF11202D |
| U30 | 7404 |
| Inductors | Value or Type |
| L1 | 50 mH |
| L2 | 50 mH |
| L3 | 50 mH |
| L4 | 72.4 mH |
| L7 | 72.4 mH |
| L8 | 50 mH |
| L9 | 50 mH |
| L10 | 50 mH |
| L11 | 72.4 mH |
| L12 | 72.4 mH |
| Jumpers | |
| E1 | |
| E2 | |
| Operational Amplifiers | Value or Type |
| U2 | LF347 |
| U4 | LF347 |
| U5 | LF347 |
| U5' | LM675T |
| U6 | LM675T |
| U11 | LF347 |
| U19 | LF347 |
| U20 | LF347 |
| U23 | LF347 |
| U25 | LF347 |
| U26 | LF347 |
| U28 | LF347 |
| Resistors | Value (in ohms) |
| R2 | 301 |
| R3 | 3.57K |
| R4 | 63.4K |
| R4' | 165K |
| R5 | 1K |
| R5' | 15K |
| R6 | 1.4K |
| R6' | 1K |
| R7 | 1K |
| R7' | 301 |
| R8 | 1K |
| R8' | 3.57K |
| R9 | 12.1K |
| R9' | 80.6K |
| R10 | 1K |
| R10' | 165K |
| R11 | 165K |
| R11' | 100K |
| R12 | 10K |
| R13 | 1.4K |
| R13' | 10K |
| Resistors | Value |
| R14 | 1K |
| R14' | 10K |
| R15 | 1K |
| R15' | 100K |
| R16 | 27.4K |
| R16' | 10K |
| R17 | 165K |
| R18 | 1K |

-continued

| Component | |
|---|---|
| R18' | 69.8K |
| R18" | 10K |
| R19 | 10K |
| R19' | 499 |
| R20 | 1K |
| R20' | 33.2K |
| R21 | 38.3K |
| R21' | 1M |
| R22 | 80.6K |
| R22' | 165K |
| R23 | 1K |
| R23' | 100K |
| R24 | 10K |
| R24' | 100 |
| R25 | 10K |
| R25" | 100 |
| R26 | 10K |
| R26' | 22.1K |
| R27 | 10K |
| R27' | 121 |
| R28 | 10K |
| R28' | 100 |
| R29 | 10K |
| R29' | 200K |
| R30 | 10K |
| R30' | 110K |
| R31 | 20K |
| R31' | 51.1K |
| R32 | 2.74K |
| R32' | 4.99K |
| R33 | 1 ohm ½ watt |
| R33' | 8.06K |
| R34 | 1 |
| R34' | 1K |
| R35 | 9.1K |
| R36 | 1.1K |
| R37 | 110K |
| R38 | 10K |
| R39 | 10K |
| R40 | 1 |
| R40' | 221K |
| R41 | 127K |
| R41' | 10K |
| R42 | 15.4K |
| R42' | 10K |
| R43 | 10K |
| R44 | 1K |
| R45 | 10K |
| R47 | 604K |
| R49 | 1K |
| R50 | 10K |
| R51 | 49.9K |
| R52 | 10K |
| R53 | 10K |
| R54 | 604K |
| R55 | 49.9K |
| R56 | 20K |
| R57 | 1K |
| R58 | 20K |
| R59 | 1K |
| R60 | 100 |
| R61 | 1K |
| R61' | 1K |
| R62 | 137K |
| R62' | 100 |
| R63 | 15K |
| R63' | 100 |
| R64 | 1.5K |
| R65 | 1K |
| R66 | 1K |
| R67 | 12.1K |
| R68 | 137K |
| R69 | 137K |
| R70 | 10K |
| R71 | 1.4K |
| R72 | 1K |
| R73 | 1K |
| R74 | 27.4K |
| R75 | 137K |
| R76 | 10K |
| R77 | 10K |

-continued

| Component | |
|---|---|
| R78 | 1K |
| R79 | 1M |
| R80' | 165K |
| R81 | 100K |
| R81' | 100 |
| R82 | 10K |
| R83 | 10K |
| R84 | 10K |
| R85 | 10K |
| R86 | 10K |
| R87 | 200K |
| R88 | 10K |
| R89 | 20K |
| RR90 | 4.99K |
| R91 | 8.06K |
| R92 | 1K |
| R97 | 100K |
| R98 | 100K |
| R107 | 845K |
| R108 | 165K |
| R109 | 1.4K |
| R110 | 15K |
| R111 | 13.3K |
| R112 | 49.9K |
| R113 | 165K |
| R114 | 845K |
| R115 | 4.99K |
| R116 | 10K |
| R117 | 10K |
| R118 | 9.09K |
| R119 | 4.53K |
| R120 | 27.4K |
| R121 | 56.2K |
| R122 | 22.1K |
| R124 | 28.7K |
| R126 | 28.7K |
| R127 | 8.06K |
| R128 | 25.5K |
| R129 | 23.2K |
| R133 | 25.5K |
| R134 | 8.06K |
| R136 | 100K |
| R137 | 49.9K |
| R138 | 49.9K |
| R139 | 100K |
| R141 | 10K |
| R142 | 10K |
| R143 | 10K |
| R144 | 10K |
| R145 | 100 |
| R146 | 100 |
| R147 | 10K |
| R148 | 10K |
| R149 | 1K |
| R150 | 10K |
| R151 | 10K |
| R152 | 100 |
| R153' | 1K |
| R154 | 35.7K |
| R155 | 35.7K |
| R156 | 1.21K |
| R157 | 15K |
| R158 | 15K |
| R159 | 47.5K |
| R160 | 82.5K |
| R161 | 845K |
| R162 | 165K |
| R163 | 1.4K |
| R167 | 165K |
| R168 | 845K |
| R164 | 15K |
| R165 | 13.3K |
| R166 | 49.9K |
| R169 | 4.99K |
| R170 | 10K |
| R171 | 10K |
| R172 | 9.09K |
| R173 | 4.53K |
| R174 | 10K |
| R175 | 10K |
| R176 | 27.4K |

-continued

| Component | |
|---|---|
| R177 | 56.2K |
| R178 | 22.1K |
| R180 | 47.5K |
| R181 | 47.5K |
| R182 | 3.32K |
| R183 | 10K |
| R183' | 27.4K |
| R184 | 100K |
| R185 | 100K |
| R187 | 10K |
| R189 | 10K |
| R190 | 150K |
| R191 | 10K |
| R192 | 1K |
| R200 | 10K |
| R201 | 10K |
| R202 | 1K |
| R203 | 20K |
| R204 | 1K |
| R205 | 100 |
| R206 | 2K |
| R207 | 2K |
| R208 | 2K |
| R209 | 10K |
| R210 | 10K |
| R211 | 10K |
| R212 | 10K |
| R213 | 100K |
| R214 | 10K |
| R215 | 10K |
| R216 | 1K |
| R217 | 3.3K |
| R218 | 10K |
| R219 | 3.3K |
| Transistors | Value or Type |
| Q1 | 2N2222 |
| Q2 | 2N2222 |
| Q3 | 2N2222 |
| Q4 | 2N2222 |
| Q5 | 2N2222 |

Although the invention has been illustrated by describing only particular preferred embodiments, its scope is not limited to them. The scope if determined by the claims.

What is claimed is:

1. Position-sensing apparatus for an automatic guided vehicle that is controlled by command signals and position feedback signals comprising:
   electrical conductor means at the floor for providing a time-varying magnetic field that extends up to the vehicle;
   magnetic sensing means on the vehicle having first and second coils for sensing said magnetic field to produce first and second electrical output signals respectively from said coils;
   said coils being spaced apart in the direction in which the position of the vehicle is to be measured;
   said coils having axes that are horizontal and disposed in the direction in which the position of the vehicle is to be measured;
   signal processing means connected for processing said first and second output signals and for outputting the resulting processed signals to be available as position feedback signals;
   said apparatus further comprises means for processing signals emanating from two differing types of electrical conductor means at the floor, namely passive loop conductor means and active guide-wire conductor means; wherein said signal-processing means comprise means for connecting said first output signal to at least two separate channels for processing, and further comprise means for connecting said second output signal to at least two separate channels for processing;
   said apparatus further comprises means for selectively being responsive to signals from said passive loop conductor means and from said active guide-wire conductor means, including means for processing said signals from said passive loop conductor means, including (a) one of said two separate channels for processing said first output signal and (b) one of said two separate channels for processing said second output signal;
   said means for selectively being responsive further comprising means for processing said signals from said active guide-wire conductor means, including (c) the other one of said two separate channels for processing said first output signal and (d) the other one of said two separate channels for processing said second output signal.

2. Apparatus as in claim 1 and wherein said signal processing means comprises conditioning means connected for processing said first and second coil output signals, including means for amplifying, attenuating, bandpass filtering, lead-lag compensating them.

3. Apparatus as in claim 2 and wherein said conditioning means comprises separate third conditioning means for said first signal, and fourth conditioning means for said second signal, said third and fourth conditioning means having separate outputs;
   and said apparatus further comprises means for combining said outputs of said third and fourth conditioning means.

4. Apparatus as in claim 3 and wherein said means for combining said outputs of said third and fourth conditioning means also comprises means for combining said command signals with said outputs.

5. Position-sensing apparatus for an automatic guided vehicle that is controlled by command signals and position feedback signals comprising:
   electrical conductor means at the floor for providing a time-varying magnetic field that extends up to the vehicle;
   magnetic sensing means on the vehicle having first and second coils for sensing said magnetic field to produce first and second electrical output signals respectively from said coils;
   said coils being spaced apart in the direction in which the position of the vehicle is to be measured;
   said coils having axes that are horizontal and disposed in the direction in which the position of the vehicle is to be measured;
   signal processing means connected for processing said first and second output signals and for outputting the resulting processed signals to be available as position feedback signals;
   means for connecting said resulting processed signals to serve as feedback signals by closing a position feedback loop including;
   means for combining said resulting processed signals with command signals for control of the vehicle;
   a main guidance system for generally navigating the vehicle when it is not at a terminal;
   a general vehicle guidance system for guiding the vehicle when the vehicle is not at a terminal;
   said main guidance system comprising navigation means for recognizing when the vehicle is at a terminal and for providing a change command thereupon for the vehicle to be controlled by said position-sensing apparatus in response to said command signals and said position feedback signals;

switching means on the vehicle receiving said change command, for enabling control of the vehicle by position-sensing apparatus in response to said command signals and said position feedback signals instead of by said general vehicle guidance system while the vehicle is at a terminal.

6. Apparatus as in claim 5 and further comprising means for transferring control of the vehicle when it leaves a terminal, from said position-sensing apparatus to said general vehicle guidance system, wherein:

said main guidance system further comprises navigation and guidance means for recognizing when the vehicle is leaving a terminal and for providing a resumption command thereupon for the vehicle to be controlled by said general vehicle guidance system;

switching means on the vehicle receiving said resumption command, for enabling control of the vehicle by said general vehicle guidance system instead of by the position-sensing apparatus when the vehicle leaves a terminal.

7. Apparatus as in claim 5 and wherein:

said magnetic sensing means comprises a magnetic antenna having a unitary core on which both of said two spaced-apart coils are disposed, and said coils are connected at a common ground and oriented so that said first and second output signals are additive when the coils sense said magnetic field.

8. Apparatus as in claim 7 and wherein said unitary core comprises a ferrite rod core.

9. Guidance apparatus for use with a vehicle that must be capable of being guided between terminals in a hybrid installation both (a) by self contained navigation and guidance and (b) by following a conductively energized guide wire at the floor, comprising:

transmitting means for inductively exciting a conductor at the floor at a terminal for terminal positioning of the vehicle;

receiving apparatus on the vehicle comprising means used in common for both (1) receiving position information from said inductively excited conductor at the floor at a terminal, and (2) receiving position information from said conductively energized guide wire at the floor between terminals;

whereby in said hybrid installation said vehicle is able to operate between terminals (a) by self contained navigation and guidance and also (b) by following said conductively energized guide wire, and is able also (c) to follow an inductively excited conductor and utilize said receiving means in common for receiving position information at a terminal.

10. Guidance apparatus as in claim 9 and further comprising:

means for storing data serving as a route map of route segments including data as to what route segments have guide wires;

means for tracking the vehicle's position on said map.

11. Transverse-position-sensing apparatus for an automatic guided vehicle that is controlled by command signals and position feedback signals, said vehicle having a longitudinal axis of travel, comprising:

electrical conductor means at the floor for providing a time-varying magnetic field that extends up to the vehicle;

magnetic sensing means on the vehicle having first and second coils spaced apart for sensing said magnetic field to produce first and second electrical output signals respectively from said coils;

said coils being spaced apart in a direction in which the position of the vehicle is to be measured, namely a direction transverse to the longitudinal axis of the vehicle;

said coils having axes that are horizontal and in a transverse direction, for sensing said magnetic field when said longitudinal axis is in a direction having a component parallel to said electrical conductor means;

signal processing means connected for processing said first and second coil output signals and for outputting the resulting processed signals to be available as transverse-position feedback signals;

second receiving means on said vehicle spaced longitudinally from said first receiving means and responsive to said time-varying magnetic field that extends up to the vehicle, for providing a second signal;

wherein said second receiving means comprises means for providing information as to the position of the vehicle's second receiving means along a direction line crossing said electrical conductor means;

means for subtracting said first and second signals and for ascertaining therefrom the heading of said vehicle relative to the direction of said electrical conductor means.

12. Apparatus as in claim 11 and further comprising:

means for providing command information to said vehicle determinative of the desired position and heading of the vehicle relative to said electrical conductor means;

means for controlling the movement of said vehicle to position the vehicle in accordance with said information as to desired position and heading and information as to the vehicle's present position and heading obtained from said first and second receiving means.

13. Apparatus for use with an automatic guided vehicle that has a longitudinal axis and that moves about with respect to a reference frame, comprising:

transmitting means on the vehicle for providing a time-varying primary magnetic field;

passive loop means on said reference frame, receiving said primary magnetic field to induce a current in said passive loop means, for producing a secondary magnetic field having a predetermined spatial pattern relative to said reference frame, said loop means having a longitudinal axis;

first receiving means on the vehicle receiving at least said secondary magnetic field for providing a first signal responsive to said secondary magnetic field;

signal processing means receiving said first signal for processing it to provide a processed signal having information as to said vehicle's position relative to a desired position.

14. Apparatus as in claim 13 and wherein said passive loop means on said reference frame is manually portable and placeable without change to a supporting floor to provide a temporary path where there is no other reference frame magnetic field means.

15. Apparatus as in claim 13 and wherein said passive loop means comprises an electrical conductor having two ends connected together and having at least one turn.

16. Apparatus as in claim 13 and wherein said passive loop means comprises a skewed-figure-8 shape of conductive loop having segments disposed as follows:
  a central conductive segment that extends generally longitudinally;
  a crossing segment that crosses said center segment;
  said center segment having a portion longitudinally forward of said crossing segment and a portion longitudinally rearward of said crossing segment;
  said crossing segment having a portion on a first side of said center segment and a portion on a second side of said center segment;
  a forward loop configuration located forward of said crossing segment and on a first side of said center segment, wherein said forward portion of said center segment and said portion of said crossing segment on said first side of said center segment are component segments of said forward loop configuration;
  a rearward loop configuration located rearward of said crossing segment and on a second side of said center segment, wherein said rearward portion of said center segment and said portion of said crossing segment on said second side of said center segment are component segments of said rearward loop configuration;
  said forward and rearward loop configurations being in series electrically.

17. Apparatus as in claim 13 and wherein:
  said passive loop means comprises both longitudinal segments and segments transverse to the longitudinal segments and said vehicle has a longitudinal axis of travel;
  said first receiving means on the vehicle comprises means for receiving signals from both longitudinal and transverse segments of said passive loop means; and
  said signal processing means comprises means for receiving signals from said first receiving means and for providing information as to the position of the vehicle in directions both along said longitudinal axis and transverse thereto.

18. Apparatus as in claim 13 and further comprising means for combining said processed signal as feedback with said command signals for control of the vehicle.

19. Apparatus as in claim 13 and further comprising:
  means for providing command information to said vehicle determinative of the desired position of the vehicle relative to said reference frame;
  means for controlling the movement of said vehicle in response to said information as to desired position and said information as to the vehicle's present position obtained from said processed signal, to achieve said desired position.

20. Apparatus as in claim 13 where in said desired position comprises an offset lateral to the longitudinal axis of said loop.

21. Apparatus as in claim 13 and wherein;
  said transmitting means on the vehicle for providing a primary magnetic field comprises magnetic coil means;
  said passive loop means for receiving said primary magnetic field and providing a secondary magnetic field comprises two series-connected loops of electrical current conductor disposed side-by-side transversely to said longitudinal axis.

22. Apparatus as in claim 13 and wherein said transmitting means on the vehicle comprises:
  oscillator means for providing an alternating electrical current;
  electromagnet means receiving said alternating electrical current, for providing, in proximity to said electromagnet means, said time-varying primary magnetic field.

23. Apparatus as in claim 13 and wherein:
  said vehicle has a general direction of forward and backward travel and a longitudinal axis in that general direction of travel, and has a lateral direction transverse to that direction of travel;
  said transmitting means comprises two magnetic core means, each encircled by at least one current-conductive coil for producing portions of said primary magnetic field; said two core means being spaced apart transversely on said vehicle;
  said loop means comprises two side-by-side loops, each having an outwardly disposed conductor segment, wherein said two outwardly disposed conductor segments are spaced apart transversely by such an amount as to enable simultaneous coupling of each of said loops with at least one of said transmitting core means.

24. Apparatus as in claim 13 and further comprising:
  means controlling the movement of said vehicle for positioning the vehicle in response to said processed signal having information as to said vehicle's position.

25. Apparatus as in claim 13 and wherein said first receiving means on the vehicle comprises:
  means that receives both signals due to said primary magnetic field received directly from said transmitting means, and signals received via said passive loop means; and,
  means for substantially disregarding signals due to said primary magnetic field and for utilizing said signals due to said secondary magnetic field.

26. Apparatus as in claim 13 and wherein:
  said first receiving means on the vehicle receiving said secondary magnetic field is so located as simultaneously to receive also said primary magnetic field, and to provide a total electrical signal accordingly, having components of signal in response to both said primary and secondary magnetic fields;
  said first receiving means further comprises means for rectifying said total signal;
  said first receiving means further comprises means for subtracting out a DC bias approximately corresponding to said component of signal produced in response to said primary magnetic field.

27. Apparatus as in claim 13 and wherein:
  said first receiving means on the vehicle receiving said secondary magnetic field is so located as simultaneously to receive also said primary magnetic field, and to provide a total electrical signal accordingly, having AC components of signal in response to both said primary and secondary magnetic fields;
  said first receiving means comprising AC means for biasing out said component of signal produced in response to said primary magnetic field, said AC means for biasing out comprising:
    phase-locked loop means for locking onto said total electrical signal and providing an AC output;
    initialization means for setting the level of AC output of said phase-locked loop means to equal said primary magnetic field component of AC signal when the vehicle is away from said passive loop means;

means for maintaining constant said set level of output of said phase-locked loop means thereafter;

means for subtracting said set level from the total signal subsequently received by said first receiving means.

28. Apparatus as in claim 27 and wherein said phase-locked loop means comprises:
means for sensing the output level of said AC output of said phase-locked loop and for providing a DC gain-control signal accordingly;
means responsive to said DC gain-control signal to control the amplitude of said AC output of said phase-locked loop to be substantially constant at said level set during initialization.

29. Apparatus as in claim 13 and wherein said first receiving means receives an AC component of magnetic field directly from said transmitting means and an AC component of magnetic field from said passive loop, and said receiving means comprises:
two magnetic receiving coils; and
only one phase-locked loop, tracking the phase of only one of said two receiving coils; and
wherein the AC output of said phase-locked loop is subtracted from the signals of both of said coils for biasing out the portion of the magnetic field that is received directly from the transmitting means.

30. Apparatus as in claim 13 and wherein said transmitting means comprises magnetic core means encircled by at least one current-conductive coil for producing a magnetic field when said coil is energized by current.

31. A method for use in a guided vehicle for providing signals signifying the position of the vehicle relative to a stationary reference frame on the floor, comprising the steps of:
establishing a time-varying primary magnetic field that extends from the vehicle to the floor;
inducing a circulating electrical current in a conductive loop provided on the floor, by operation of said time-varying primary magnetic field;
said circulating electrical current producing a time-varying secondary magnetic field that extends from at least one segment of the loop to the vehicle, said secondary magnetic field having a field strength pattern whose shape varies in accordance with distance and direction from said segment;
inducing a second electrical current in at least one magnetic receiving antenna on the vehicle by operation of said secondary magnetic field, said second electrical current being dependent upon the secondary magnetic field strength at said magnetic receiving antenna;
processing said second electrical current to provide information as to the distance of said receiving antenna from said segment of said loop.

32. A method for initializing apparatus that is used for determining the position of an automatic guided vehicle that determines its position by measuring a secondary magnetic field component produced by an induced passive-loop current located off the vehicle, in the presence of a primary magnetic field component produced by an on-board transmitter, comprising:
measuring the total received magnetic field under conditions in which the vehicle is free of effects of magnetic fields originating from passive loops located off the vehicle;
providing a bias signal to be subtracted from the total received signal;
setting the bias signal to bias out the received primary magnetic field signal under said effect-free conditions;
maintaining substantially the same bias signal setting while magnetic field measurements are made under conditions having secondary-magnetic-field effects of a passive loop;
whereby the primary magnetic field signal remains biased out during measurements and the remaining signal represents only the induced secondary magnetic field component, which is thereby separately measurable.

33. A position-sensing apparatus for hybrid vehicles that are operable in areas of a reference frame having different types of guidance equipment on the floor, i.e., (a) passive loop type and/or (b) active guide-wire type, comprising:
command means for providing port and starboard command signals for directing the vehicle;
transmitting means on the vehicle for providing a time-varying primary magnetic field;
passive loop means on said reference frame, receiving said primary magnetic field to induce a current in said loop means, for producing a secondary magnetic field having a predetermined spatial patter relative to said reference frame;
said loop means having a longitudinal axis;
magnetic sensing means on the vehicle, having first and second coils for (a) receiving at least said secondary magnetic field for providing first and second signals respectively from said coils in response to said secondary magnetic field, said first and second coils functioning also for (b) receiving a magnetic field produced by an active guide wire at the floor that carries electrical current of a predetermined guide-wire frequency and for providing corresponding third and fourth electrical signals from said first and second coils respectively;
said first and second coils being spaced apart in the direction in which the position of the vehicle is to be measured;
said coils having axes that are horizontal and oriented in the direction in which the position of the vehicle is to be measured;
loop-signal-processing means connected for processing said first and second electrical signals and for outputting the resulting processed loop signals so as to be available as position feedback signals;
guide-wire-signal-processing means connected for processing said third and fourth electrical signals and for outputting the resulting processed guide-wire signals so as to be available as position feedback signals;
switchable circuit means for selectively enabling control of the system by guidance equipment on the floor of either (a) the passive loop type or (b) the active guidewire type; and;
means for combining said first and second, and/or third and fourth feedback signals with said port and starboard command signals for controlling the vehicle.

34. Position-sensing apparatus as in claim 33 and wherein said means for combining comprises means for combining on an amplitude-difference basis so as to assign control to be of the passive loop type or the active guide-wire type, comprising:

switching means for stopping said first and second signal by turning off said transmitting means when control is assigned to be of said active-guide-wire type;

switchable attenuator means for switchably attenuating said third and fourth signal when control is assigned to be of said passive loop type.

35. Position-sensing apparatus as in claim 33 and wherein said means for differentiating between lateral-position-sensing signals of the passive loop control type and lateral-position-sensing signals of the active-guide-wire control type on an amplitude-difference basis comprises:

attenuator means for attenuating said third and fourth signals;

switching means for enabling and disabling said attenuating means;

control means for actuating said switching means to a condition of enabling said attenuating means to attenuate the active-guide-wire type of signals when the magnetic transmitting means is transmitting magnetic fields to said loop means.

36. Position-sensing apparatus as in claim 33 and further comprising:

switching means for turning said transmitting signal on and off;

computer control means for actuating said switching means to on and off states;

whereby said transmitter signal is on when said vehicle is relying on said passive loops for control and is off at other times.

37. Apparatus for sensing the position of a guided vehicle comprising:

current-conductive means at the floor for providing a magnetic field that extends to the vehicle, said magnetic field being in a field pattern that varies in accordance with distance form the current-conductive means;

magnetic field sensing means on the vehicle for sensing magnetic fields provided by said current-conductive means at the floor and providing signals accordingly;

signal-processing circuit means on the vehicle receiving said signals;

a first subchannel circuit means connected to receive signals from said signal-processing circuit means, for separating passive-loop lateral-positioning signals, when such signals are present, from other signals by attenuation of one of the signals;

second subchannel circuit means connected to receive signals from said signal-processing circuit means, for processing guide-wire-lateral-positioning signals when such signals are present, and for attenuating signals when the passive-lateral-positioning signals are present, separating said guide-wire and passive loop signals from each other on a basis of amplitude difference;

both of said subchannel circuit means having their outputs connected for communicating the position of the vehicle to other apparatus.

38. Apparatus for use with an automatic guided vehicle that moves about with respect to a reference frame comprising:

transmitting means on the vehicle for providing a time-varying primary magnetic field;

passive loop means on said reference frame, receiving said primary magnetic field to induce a current in said passive loop means for producing a secondary magnetic field having a predetermined spatial pattern relative to said reference frame;

receiving means on the vehicle receiving said primary and secondary magnetic fields for providing a total electrical signal in response thereto, having components of signal in response to both said primary and secondary magnetic fields;

signal processing means receiving said signal for processing it to provide a processed signal having information as to said vehicle's position;

said receiving means further comprising automatic bias-setting means for compensating for said component of signal produced in response to said primary magnetic field, said automatic bias-setting means comprising:

subtraction means receiving said total electrical signal for subtracting out a bias signal and outputting a compensated signal;

means for commanding said automatic bias-setting means to set the bias while the vehicle is positioned remotely from said secondary magnetic field, whereby to sense only said component of signal response to said primary magnetic field;

an event counter capable of counting up or down depending upon a direction signal, and of providing a digital count;

means for producing countable event signals at time intervals that are controllable by a frequency-control signal, said countable event signals being connected, for counting, with said event counter;

means receiving said compensated signal for providing a frequency-control signal dependent upon the magnitude of said compensated signal, said frequency-control signal resulting in zero count frequency when said compensated signal is zero;

means for sensing the polarity of said compensated signal and providing said direction signal to said event counter to count up for one polarity and down for the other polarity of said compensated signal;

digital-to-analog conversion means for converting said digital count to an analog bias signal having such polarity as to drive said compensated signal to zero.

39. Means for providing a temporary traffic lane for an automatic guided vehicle that is controlled by command signals and position feedback signals from a guide wire at the floor, said providing means comprising:

at least one passive guide wire containing mat which when laid on the floor defines at least a portion of said lane;

at least one active guide wire loop;

means on the vehicle for inducing a sensible electrical signal in a passive guide wire when the vehicle is over the passive guide wire;

means for being selectively response to signals from said passive guide wire;

means for being selectively responsive to signals from said active guide wire;

means for causing the vehicle to transfer from a passive guide wire to an active guide wire and from an active guide wire to a passive guide wire.

40. Means according to claim 39 wherein said mat is portable and is manually positionable.

* * * * *